(12) United States Patent
Lobo et al.

(10) Patent No.: US 12,212,679 B2
(45) Date of Patent: *Jan. 28, 2025

(54) SYSTEMS AND METHODS OF AUTHENTICATING ITEMS

(71) Applicant: Walmart Apollo, LLC, Bentonville, AR (US)

(72) Inventors: Charles H. Lobo, Cave Springs, AR (US); Sid Shake, Rogers, AR (US); Bruce W. Wilkinson, Rogers, AR (US); David M. Nelms, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,836

(22) Filed: Oct. 2, 2023

(65) Prior Publication Data
US 2024/0031161 A1 Jan. 25, 2024

Related U.S. Application Data

(63) Continuation of application No. 18/101,965, filed on Jan. 26, 2023, now Pat. No. 11,811,941, which is a
(Continued)

(51) Int. Cl.
*H04L 9/32* (2006.01)
*G06F 16/23* (2019.01)
(Continued)

(52) U.S. Cl.
CPC ........ *H04L 9/3234* (2013.01); *G06F 16/2365* (2019.01); *G06F 16/2379* (2019.01);
(Continued)

(58) Field of Classification Search
CPC ..... H04L 9/3234; H04L 9/0637; G06F 16/27; G06F 16/2379; G06F 16/2365; G06Q 20/389

See application file for complete search history.

(56) References Cited

U.S. PATENT DOCUMENTS 9,667,416 B1 * 5/2017 Machani ............... H04L 9/3215
9,849,364 B2 12/2017 Tran
(Continued)

FOREIGN PATENT DOCUMENTS

CN 106897887 6/2017
WO 2017027648 2/2017

OTHER PUBLICATIONS

Blank, Oren; "The Bitcoin Blockchain—The next step in cloud based eWarranty"; http://www.warranteer.com/the-bitcoin-blockchain-the-next-step-in-cloud-based-ewarranty; Sep. 1, 2017; pp. 1-6.
(Continued)

*Primary Examiner* — Yonas A Bayou
(74) *Attorney, Agent, or Firm* — Fitch, Even, Tabin & Flannery LLP

(57) ABSTRACT

In some embodiments, systems and methods provide distributed item authentication. In some embodiments systems comprise: a housing; a set of sensor systems; a transceiver; and an authentication control circuit configured to: obtain first sensor data of an item being authenticated, obtain an initial identification of the item; access an item authentication block specific to the item; obtain a first set of authentication instructions; control one or more sensor systems in accordance with the first set of authentication instructions; compare multiple current authentication sensor data to the set of multiple historic authentication sensor data; confirm that each of a threshold number of the multiple current authentication sensor data is consistent within a threshold variation of a corresponding one of the set of multiple historic authentication sensor data; and cause the item authentication block to be updated to include the confirmation of authentication of the item.

20 Claims, 11 Drawing Sheets

Related U.S. Application Data continuation of application No. 16/541,563, filed on Aug. 15, 2019, now abandoned.

(60) Provisional application No. 62/719,493, filed on Aug. 17, 2018.

(51) Int. Cl.
  *G06F 16/27* (2019.01)
  *G06Q 20/38* (2012.01)
  *H04L 9/06* (2006.01)
  *H04L 9/00* (2022.01)

(52) U.S. Cl.
  CPC .......... *G06F 16/27* (2019.01); *G06Q 20/389* (2013.01); *H04L 9/0637* (2013.01); *H04L 9/50* (2022.05)

(56) References Cited

U.S. PATENT DOCUMENTS

| | | | | |
|---|---|---|---|---|
| 11,201,746 | B2* | 12/2021 | Ranganathan | H04L 9/3247 |
| 11,314,699 | B1* | 4/2022 | Wu | G06F 40/174 |
| 11,341,102 | B1* | 5/2022 | Wu | H04L 9/50 |
| 11,361,388 | B1* | 6/2022 | Floyd | G06Q 40/08 |
| 11,367,071 | B2* | 6/2022 | Gonzales, Jr. | H04L 9/3297 |
| 11,477,034 | B2* | 10/2022 | Guo | H04L 9/3263 |
| 11,481,848 | B1* | 10/2022 | Floyd | G01D 9/00 |
| 11,483,157 | B2* | 10/2022 | Chow | G06Q 20/3827 |
| 11,811,941 | B2 | 11/2023 | Lobo | |
| 2007/0226514 | A1* | 9/2007 | Maletsky | H04L 9/3234 713/186 |
| 2016/0098730 | A1 | 4/2016 | Feeney | |
| 2016/0162897 | A1* | 6/2016 | Feeney | H04L 9/3236 705/71 |
| 2016/0191243 | A1* | 6/2016 | Manning | H04L 63/18 713/168 |
| 2017/0046806 | A1* | 2/2017 | Haldenby | G06Q 40/08 |
| 2020/0059363 | A1 | 2/2020 | Lobo | |
| 2023/0171107 | A1 | 6/2023 | Lobo | |

OTHER PUBLICATIONS

Finextra; "Everledger secures the first bottle of wine on the blockchain"; https://www.finextra.com/pressarticle/67381/everledger-secures-the-first-bottle-of-wine-on-the-blockchain; Dec. 9, 2016; pp. 1-6.

Peck, Morgen E.; "The Future of the Web Looks a Lot Like the Bitcoin Blockchain"; https://spectrum.ieee.org/computing/networks/the-future-of-the-web-looks-a-lot-like-bitcoin; Jul. 1, 2015; pp. 1-8.

Trotter, Cate; "How blockchain is changing the future of retail"; https://www.linkedin.com/pulse/how-blockchain-changing-future-retail-cate-trotter; Jul. 4, 2017; pp. 1-7.

U.S. Appl. No. 16/541,563; Non-Final Rejection mailed May 12, 2022; (11 pages).

U.S. Appl. No. 16/541,563; Notice of Allowance and Fees Due (PTOL-85) mailed Nov. 2, 2022; (10 pages).

U.S. Appl. No. 18/101,965; Notice of Allowance and Fees Due (PTOL-85) mailed Jul. 3, 2023; (11 pages).

* cited by examiner

SYSTEMS AND METHODS OF AUTHENTICATING ITEMS

CROSS-REFERENCE TO RELATED APPLICATION

This application is a continuation of U.S. application Ser. No. 18/101,965, filed Jan. 26, 2023, which is a continuation of U.S. application Ser. No. 16/541,563, filed Aug. 15, 2019, which claims the benefit of U.S. Provisional Application No. 62/719,493, filed Aug. 17, 2018, each of which is incorporated herein by reference in its entirety.

TECHNICAL FIELD

This invention relates generally to systems to authenticate items.

BACKGROUND

It can be difficult to confirm the authenticity of an item. It can be beneficial in many different scenarios to authenticate an item. Authentication can often be costly or unavailable for many items and in many situations.

BRIEF DESCRIPTION OF THE DRAWINGS

Disclosed herein are embodiments of systems, apparatuses and methods pertaining to the authentication of items. This description includes drawings, wherein.

Figure 1:
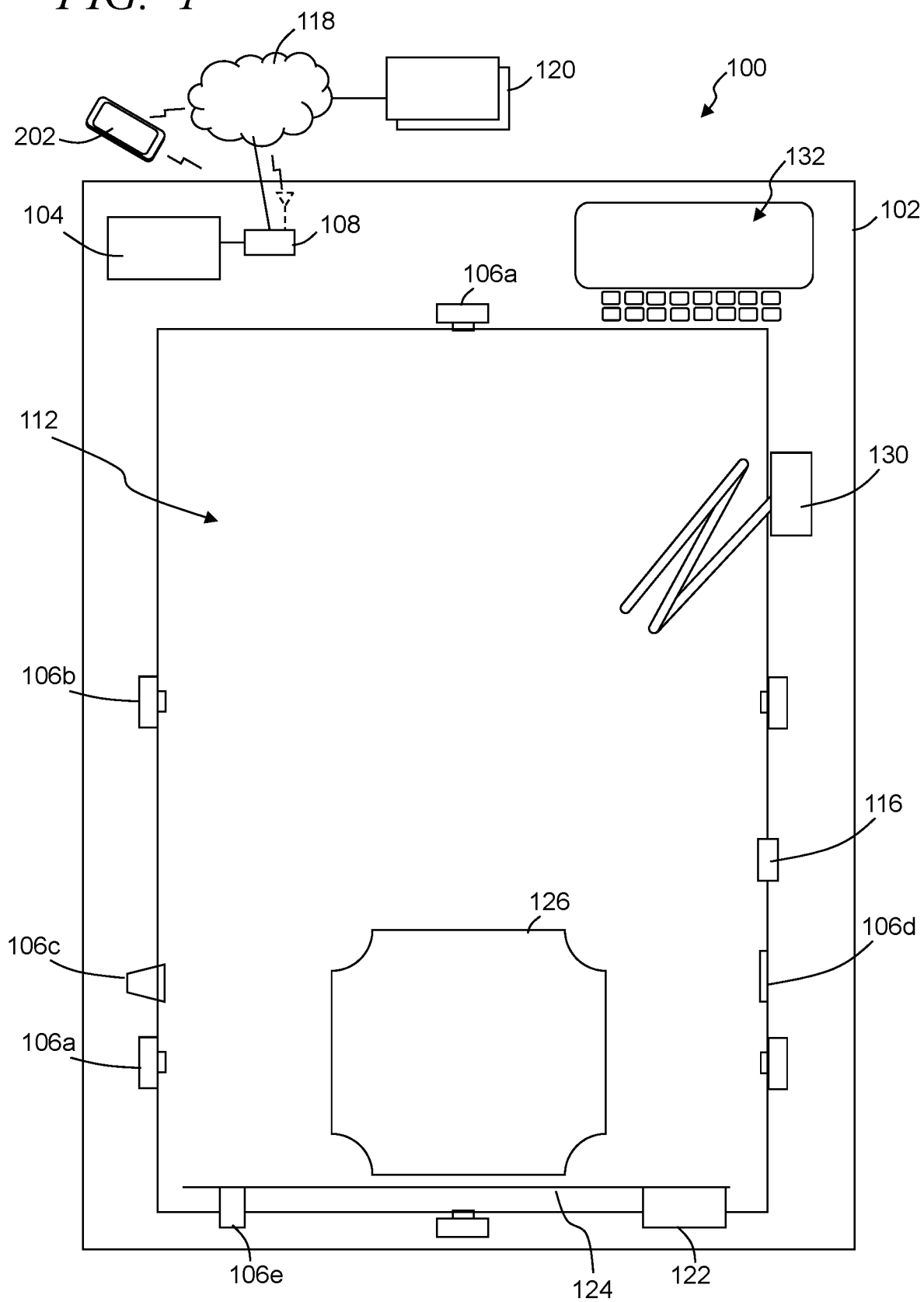
FIG. 1 illustrates a simplified block diagram of an exemplary distributed cryptographic item authentication system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to authenticate one or more items as part of transactions. Some embodiments provide distributed cryptographic item authentication systems having a housing, a set of sensor systems secured with the housing (e.g., an image capture system); a transceiver configured to enable communication over a distributed computer network to access a cryptographic distributed ledger blockchain database source; and an authentication control circuit coupled with non-transitory memory storing code. The authentication control circuit is configured to: obtain first sensor data from at least a first item identifying sensor system of an item being authenticated, and obtain an initial identification of the item based on the first sensor data; access, through the transceiver, the blockchain database source and acquire an item authentication block specific to the item; obtain, from the item authentication block, a first set of authentication instructions to be applied by the authentication control circuit in authenticating the item, and a previously acquired collection of a set of multiple historic authentication sensor data specific to the item; control one or more sensor systems of the set of sensor systems in accordance with the first set authentication instructions to capture a collection of multiple different current authentication sensor data specific to the item; compare the multiple current authentication sensor data to the set of multiple historic authentication sensor data; confirm, in authenticating the item, that each of a threshold number of the multiple current authentication sensor data is consistent within a threshold variation of a corresponding one of the set of multiple historic authentication sensor data; and cause the item authentication block within the distributed ledger blockchain database to be updated to include the confirmation of authentication of the item.

Further, some embodiments provide methods of providing distributed cryptographic item authentication, comprising: obtaining, from at least a first item identifying sensor system of a set of sensor systems, first sensor data corresponding to an item being authenticated, and obtaining an initial identification of the item based on the first sensor data; accessing, through a transceiver and over a distributed computer network, a cryptographic distributed ledger blockchain database source and acquiring an item authentication block specific to the item; obtaining, from the item authentication block, a first set of authentication instructions to be applied in authenticating the item, and a previously acquired collection of a set of multiple historic authentication sensor data specific to the item; controlling one or more sensor systems of the set of sensor systems in accordance with the first set of authentication instructions to capture a collection of multiple different current authentication sensor data specific to the item; comparing the multiple current authentication sensor data to the set of multiple historic authentication sensor data; confirming, in authenticating the item, that each of a threshold number of the multiple current authentication sensor data is consistent within a threshold variation of a corresponding one of the set of multiple historic authentication sensor data; and causing the item authentication block within the distributed ledger blockchain database to be updated to include the confirmation of authentication of the item.

Often transactions between two or more parties includes the transfer of an item. The authenticity of this item is typically one of the factors in determining whether the transaction will take place and/or a value to be exchanged for that item. Some embodiments provide de-centralized systems that allow parties of a transaction to access a distributed digital ledger to in part obtain: authenticating attributes (e.g., characteristics, markings, identifiers, etc.), chain of title information and other such information exclusively corresponding to that particular item that can be used in determining and/or confirming an authenticity of an item. Additionally, captured attribute information, transfer of title information and/or other such information can be added to a corresponding record within the digital ledger that is exclusively associated with that particular item. For example, some embodiments provide a de-centralized system for party-to-party transactions (e.g., exchanges, sales, etc.) that utilizes blockchain and digital currency for exchange and bartering. The system facilitates original as well as secondary sales and services exchanges. The system provides significant cost advantages, which can take advantage of inherent benefits of cryptocurrencies. Further, the authentication system and/or authentication service provider can acquire a benefit and/or revenue for authentication of an item, providing access to the ledger authentication information and/or incorporating updates to the ledger authentication information following the completion or failure to complete a transaction. In some instances, the authentication system and/or authenticating service provide can utilize its own cryptocurrency (e.g., retail service provider currency) and the service provider can collect a fee for facilitating these transactions, which may in some instances be encoding into the cryptocurrency.

FIG. 1 illustrates a simplified block diagram of an exemplary item authentication system 100, in accordance with some embodiments. The authentication system 100 includes at least one authentication control circuit 104, a set of one or more sensor systems 106 and one or more communication transceivers 108. Typically, the authentication system 100 includes a housing 102 with which the authentication control circuit, one or more of the sensors systems and/or the communication transceiver can be cooperated. The authentication control circuit 104 is communicatively coupled via one or more communication system networks, buses or the like with the sensor systems 106 and the one or more transceivers 108 providing control over the sensor systems and transceivers and receiving corresponding sensor information from the sensor systems and communications via the transceiver from external systems and/or devices. The authentication control circuit 104 includes and/or couples with non-transitory memory that stores code, software, applications and the like to be implemented by the authentication control circuit enabling the authentication control circuit to implement one or more functions to provide authentication of items.

The housing can include one or more interior item cavities 112 configured to receive an item to be authenticated. Some embodiments include one or more doors, movable panels or the like to at least temporarily close the item cavity 112. In some implementations, one or more door locks 116 are included that can be activated to secure the item within the corresponding one of the one or more item cavities 112. The lock may be activated by the authentication control circuit 104, manually be a user, wirelessly via one or more external devices (e.g., a user's smartphone, tablet, fob, RFID card, or other such user interface system), other such methods or a combination of two or more of such methods.

The one or more authentication control circuits 104 are secured with the housing 102, and one or more of the sets of sensor systems 106 are positioned relative to one or more of the item cavities 112 to acquire relevant sensor information corresponding to an item 126 placed within the corresponding item cavity. The sensor systems can include one or more image capturing systems 106a (e.g., still imaging systems and/or video systems), hyperspectral imaging systems, color and/or light spectrometers 106b, radio frequency identifier (RFID) tag readers 106c, bar code reader systems 106d, weight sensor systems 106e, distance measurement systems, scanning systems (2D and/or 3D scanning system), other such sensor systems, and typically two or more of such types of sensor systems.

The transceiver 108 is configured to provide wired and/or wireless communication over one or more external distributed computer and/or communication networks 118 (e.g., WAN, LAN, Wi-Fi, Cellular, Bluetooth, satellite, etc.) to access at least one or more cryptographic distributed ledger blockchain database sources 120, servers and/or other such nodes. The blockchain database sources 120, servers and/or other such nodes are often multiple independent nodes. As further described below, the distributed database and shared ledger database generally refer to methods of peer-to-peer record keeping and authentication in which records are kept at multiple different nodes (and often independent nodes) in the peer-to-peer network instead of kept at a trusted party. A blockchain may generally refer to a distributed database that maintains a growing list of records in which each block contains a hash of some or all previous records in a particular chain to secure the record from tampering and unauthorized revision. In some embodiments, a block in a blockchain may include one or more of a data hash of one or more previous blocks, a timestamp, a cryptographic nonce, a proof standard, a data descriptor to support the security and/or incentive features of the system, and in some instances addition data incorporated at the timestamp (e.g., authentication information, item identifier information, participant identifier information, authentication system identifier information, etc.).

In some embodiments, the authentication system 100 includes one or more motors 122, hydraulics, and/or other such mechanisms that are cooperated with one or more supports 124 (e.g., platform, plate, hook, etc.). The authentication control circuit can communicatively couple with the one or more motors (or a motor control system of the motor) to control the one or more motors, magnetic systems, hydraulics, cable systems, and the like in physically manipulating an item 126 and/or an orientation of the item within the item cavity 112. Further, in some embodiments, one or more motors, hydraulics and/or other such mechanisms can additionally or alternatively control the physical position and/or movement of one or more sensor systems relative to the item cavity to control the relative orientation of one or more sensor systems. Additionally or alternatively, one or more manipulation systems 130 (e.g., extendable arms, bars, beams, grippers, end effectors, crane systems, cable operated systems, and/or other such manipulation systems) can be included or cooperated with one or more of the item cavities 112 to interact with and manipulate the item 126 and/or orientation of the item. Typically, such manipulation systems include one or more motors, hydraulics, magnetic systems, cable systems, etc. that can be activated to cause the manipulation system to engage and manipulate the item. In some instances, the manipulation system may include a separate control circuit that controls the motor in response to input from the authentication control circuit 104, while in other instances, the authentication control circuit directs the motors, hydraulics and/or other such systems to cause movement of the manipulation system. Additionally or alternatively, the authentication system 100 and/or one or more sensor systems 106 of the authentication system 100 may include one or more motors, magnetic systems, hydraulics, etc. that can be used to move and/or otherwise adjust one or more of the sensor systems 106 or portions of the sensor systems relative to the item to achieve a desired orientation of the sensor system or portion of the sensor system relative to the item being authenticated.

Figure 2:
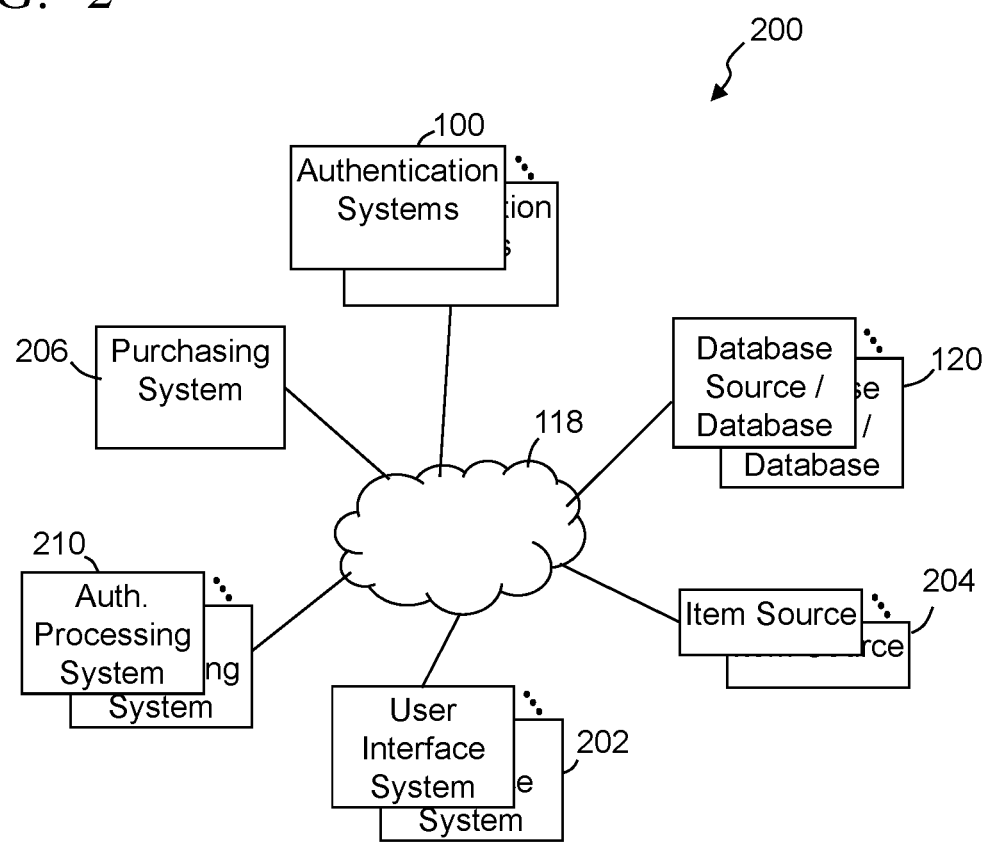
FIG. 2 illustrates a simplified block diagram of a distributed cryptographic item authentication system utilizing an authentication system, in accordance with some embodiments.

FIG. 2 illustrates a simplified block diagram of a distributed cryptographic item authentication system 200 utilizing the authentication system 100, in accordance with some embodiments. The system 200 includes at least one and typically multiple different authentication systems 100, which may be distributed at multiple different and geographically distributed locations (e.g., different locations within a single city, different cities, different states, different countries, etc.). For example, the authentication systems 100 may be associated with a retailer having multiple different retail stores at multiple different locations, with the authentication systems being placed at one or more of the retail stores. The authentication systems 100 communicatively couple with the external network 118 and can wired and/or wirelessly electronically access and/or be accessed by the blockchain database sources 120. In some embodiments, one or more users attempting to authenticate an item may utilize their own personal user interface system 202 (e.g., smartphone, tablet, computer, etc.) to communicate with one or more authentication systems 100 and/or the blockchain database sources 120. Further, one or more item sources 204 (e.g., manufacturers, distributors, etc.) may communicate over the distributed network 118 with the blockchain database sources. Still further, in some embodiments, some or all of an authentication system 100 may be implemented within a user interface system 202 as described further below. In some implementations, the system may include one or more purchasing systems 206 and/or point of sale systems to enable money to be paid. For example, a purchasing system 206 may be communicatively coupled with the authentication control circuit 104 and can communication payment information to the authentication control circuit (e.g., payment through a credit card, bank debit, or other such payment from one or more parties or third parties to an authentication and/or transaction). Some embodiments may include one or more remote authentication processing systems 210 that are in communication with one or more authentication systems 100. These authentication processing systems can provide at least some of the computational processing of sensor data relative to the collections of one or more sets of historic authentication sensor data specific to the item accessed from the item authentication block exclusively associated with that item. One or more authentication system 100 may communicate some or all of the sensor data to one or more authentication processing system 210 that can perform some of the authentication processing (e.g., image processing, image comparison, other such comparisons, and the like).

As introduced above, the authentication control circuit 104 obtains sensor data from one or more sensor systems 106. For example, in some implementations, the authentication control circuit 104 obtains identifying sensor data from one or more item identifying sensor systems 106 (e.g., RFID tag reader system 106c, barcode reader system 106d, imaging system 106a having image recognition processing system, etc.) of an item 126 being authenticated. For example, an RFID tag reader system 106c and/or barcode reader/scanner system 106d may be positioned adjacent the opening to the item cavity to detect identifying information as the item is placed into the item cavity. Additionally or alternatively, one or more exterior sensor systems (e.g., an RFID tag reader 106c, camera, and/or barcode reader system 106d may be positioned exterior of the housing) and the authentication system 100 may instruct a user to position the item relative to the exterior sensor system to capture identifying information prior to the item being placed within the item cavity. An initial identification of the item can be obtained based on the identifying sensor data. In some embodiments, the identifying information is extracted from the identifying sensor data (e.g., an RFID identifier, a barcode number, a serial number, etc.), while in other instances the identifying sensor data may be used relative to one or more databases and/or communicated to a third party service and/or the blockchain database source 120 to obtain the identifying information. In some embodiments, this identifying information is used, at least in part to access an appropriate blockchain block or record corresponding to that item at the blockchain database source 120. Further, an identification of the item and/or some identifying information may be inputted by a user through a user interface 132 of the authentication system (e.g., touch screen, keyboard, mouse, touchpad, buttons, etc.), and/or communicated from a user's smartphone, tablet, or other user interface system (e.g., through an APP on the smartphone, through direct wireless communication (e.g., Bluetooth, etc.), cellular, or the like).

The authentication control circuit can access, through the transceiver 108, the one or more blockchain database sources 120 to acquire and/or access an item authentication block specific to the item. This is typically acquired based at least in part on the identifier information of the item being authenticated. From the item authentication block, a set of one or more authentication instructions can be obtained that are to be applied by the authentication control circuit in authenticating the item. Further, one or more previously acquired collections of sets of multiple historic authentication sensor data specific to the item can be accessed from the item authentication block. Based on the set of authentication instructions, the authentication control circuit 104 can control one or more sensor systems of the set of sensor systems 106, and/or motors 122 in accordance with the set of authentication instructions to capture a collection of multiple different current authentication sensor data specific to the item. In some embodiments, for example, images and/or video content may be captured by one or more cameras, a 3D scan may be acquired of the item, a weight of the item may be acquired, and/or other such sensor information. Similarly, the imaging systems may be controlled to get images at multiple different zoomed levels. The zoom level may be controlled based on image processing and recognition of specific parts of the item. For example, the camera systems may be controlled and/or moved relative to the item, and/or the item may be moved to a desired portion of the item to align with a particular camera system, and the camera can be zoomed in to get a desired zoomed in image of the portion of the item. The zooming process may include repeated physical and/or orientation adjustments to the item and/or the imaging systems as the zoom is implemented to ensure the desired portion of the item is aligned with the field of view of the imaging system as it continues to zoom. Again, the adjustment of orientation can be based on feedback from one or more sensor systems, such as repeated or continued image processing and analysis, changes in weight distribution, changes in distance measurements, etc. Such information to achieve the desired alignment and zooming may be provided in the block or acquired from a separate remote server or other source, which is typically based on an identifier of the item.

In many instances, the authentication instructions define a sequence of sensor systems 106 to be activated in obtaining the authentication information. As such, a set of authentication instructions can specify a sequence or order in which to implement and/or active multiple sensor systems of the set of sensor systems. The authentication control circuit in controlling the one or more sensor systems can activate, in accordance with the specified sequence, each of a set of some or all of the multiple sensor systems as specified by the set of authentication instructions in capturing at least some of the current authentication sensor data. Again, the sequence may be defined in the block for the current item, or may be specified in instructions received from a remote source (e.g., manufacturer, third party authentication entity, etc.). For example, the sequence may instruct that imaging systems are activated at a first zoom level, followed by activation of one or more motors based on a detected orientation of the item to move the item to a desired orientation, and following the movement the imaging system can be operated to capture imaging content at a second zoom level, followed by an activation of a color spectrometer, followed by acquiring weight sensor data, which may be followed by one or more other sequence steps. The sequence is dependent on the available sensor systems 106, available item manipulation systems, the item being authenticated and the like. In some instances, for example, the authentication control circuit detects one or more sequence steps that cannot be performed by the particular authentication system (e.g., does not include a particular sensor system), and skips until a following sequence step that can be performed. A notification may be presented to the user and/or incorporated into the item authentication block for that item. Such missing sensor data may affect an authentication and/or a level of authentication achieved by the system.

The multiple current authentication sensor data can be compared to the one or more sets of multiple historic authentication sensor data. In some embodiments, the authentication processing includes accessing a set of one or more authentication rules that when applied enhance the operation of the authentication control circuit 104 and authentication process. In applying one or more of the authentication rules, the multiple current authentication sensor data can be compared to the one or more sets of multiple historic authentication sensor data accessed through the blockchain database sources. Applying the one or more authentication rules typically includes evaluating the comparisons of sensor data to one or more corresponding thresholds. Based on the comparison, the authentication control circuit can confirm, in authenticating the item, whether and/or when each of a threshold number of the multiple current authentication sensor data is consistent within a threshold variation of a corresponding one of the set of multiple historic authentication sensor data.

In some embodiments, an original set of historic authentication sensor data generated by an original source of the item (e.g., a manufacturer, distributor, retailer, etc.) may be incorporated into the historic authentication sensor data within the item authentication block specific to the item. Such original set of historic authentication sensor data may be generated by an original source of the item (e.g., manufacturer, distributor, etc.). For example, during manufacturing and/or prior to shipment of an item, the manufacturer can accumulate relevant sensor data and initiate an item authentication block for that item into which the relevant sensor data is appended. Additional information can be incorporated into the authentication block over time, such as but not limited to shipment date, receipt date, updated and/or authentication information at the time of receipt (e.g., additional sensor data, authentication determination, name of receiving entity, etc.), sale date, authentication information at the time of sale, and other such data. Subsequent authentications can be performed and the item authentication block specific to that item can be updated over time providing a record or authenticity and/or chain of ownership. As such, in some instances, the item authentication block of a block chain can include original authentication data from a manufacturer, distributor or other source, as well as subsequent information incorporated over time.

Based on the comparison between current and historic information, the control circuit can confirm, in authenticating the item, whether and/or when each of a threshold number of the multiple current authentication sensor data is consistent within a threshold variation of a corresponding one of the set of multiple historic authentication sensor data. The thresholds are dependent on the type of sensor. In some applications, the thresholds may vary depending on the capabilities of the sensor systems being used. For example, a greater margin of error may be available when sensor systems provide a lower level of accuracy. However, such variations in threshold may further be dependent on a number of sensor systems available to acquire authenticating sensor data. As such, some embodiments accept a greater margin of error between current and historic sensor data when there are a greater number of different types of sensor data available to evaluate in determining an authentication of an item. Similarly, the thresholds may be increased and/or a reduced margin of error may be allowed with a lower number of types of sensor data are available for consideration. Still further, however, the threshold may vary and/or a number of types of sensor data used to determine an authentication of an item may vary based on types of one or more sensor systems used to obtain the sensor data. When a more accurate sensor system is used, for example, that provides a higher degree of reliability of sensor data, the number of different types of sensor data needed to determine an authentication can be reduced.

Further, in some embodiments, the control circuit can cause the item authentication block within the distributed ledger blockchain database to be updated to include the confirmation of authentication of the item, and/or other relevant information (e.g., the multiple current authentication sensor data, identifying information of one or more of the users and/or parties to a transaction, and/or other such information). In updating the block, the authentication control circuit can in some applications distribute the multiple current authentication sensor data and cause the item authentication block within the distributed ledger blockchain database to be updated to include the multiple current authentication sensor data to be available in a subsequent authentication of the item. Further, in some embodiments, all of the sequence steps of a set of authentication instructions may not be completed. For example, the control circuit may implement the comparison of sensor data as the sensor data is acquired, and once the threshold number of sensor data is confirmed as being within the threshold variation of a corresponding one of the set of multiple historic authentication sensor data resulting in a threshold confidence that the item is authenticated or confirmed to be a different item, the control circuit may interrupt the sequence prior to completing the sequence. Similarly, the control circuit may interrupt the implementation of one or more of the authentication instructions and/or sequence of instructions in response to confirming a threshold inconsistency is detected for a threshold number of sensor data of a corresponding one of the set of multiple historic authentication sensor data, confirming that the item is not the item attempting to be authenticating and/or confirming that authentication of the item cannot be confirmed.

The system has access to information about the authentication attributes being considered. Typically, such authentication attributes are maintained in the item authentication block specific to the item. The sensor data or captured attribute information can be evaluated relative to the stored information in the item authentication block. A level of confirmation of an authentication of the item may be achieved when a threshold number of attributes each reach a corresponding threshold relationship and/or match with stored attributes (e.g., stored in blockchain record associated with the item). The threshold number of attributes and/or the threshold correlation between current and historic information may vary depending on which attributes are considered (e.g., some attributes designated with greater priority) and/or degree of correlation and/or difference between one or more attributes (i.e., greater correlation may result in reduced "number threshold", and similarly greater difference/disparity would include increased number threshold.

When an authentication is not confirmed some embodiments generate and communicate a notification to one or more entities (e.g., one or more parties to the transaction, a manufacturer, a distributor, a service provider providing the access to the authentication system, one or more third party authentication entities, government and/or law enforcement authorities, and/or other such entities). The communication can include displaying on a display of the authentication system, wirelessly communicating to a user interface system, generating an audible notification at the authentication system, communicating to a server that can communicate with one or more entities, other such communications, or combination of two or more of such communications. In some instances, a new block may be initiated for the unauthenticated item, which can be used to track the unauthenticated item and/or transactions associated with the unauthenticated item.

In some embodiments, the authentication instructions include instructions that the user is to follow in orienting the item relative to the sensor systems. The authentication instructions, for example, can comprise instructions for how to achieve a physical orientation between one or more of the sensor systems of the set of sensor systems and the physical position of the item. The authentication control circuit can receive sensor data based on a current orientation, and provide feedback to the user directing the user to make physical adjustments to achieve the desired physical orientation between the one or more sensor systems and the item. In some embodiments, the authentication control circuit continues to monitor sensor data as the user implements physical adjustments to the item and/or after movement within the item cavity has ceased, and based on the sensor data can compare that to an intended orientation to determine whether further adjustments are desired and what those adjustments should be. Feedback can be provided to the user based on the determined additional adjustments directing the user to make physical adjustments to achieve the desired physical orientation between one or more sensor systems and the item. The feedback may be provided through the user interface 132, communicated to a user interface system of the user, audibly generated, and/or other such methods. For example, in some embodiments, the authentication control circuit can cause graphics to be displayed graphically showing the desired physical movements of the item. In some instances, a generic item is illustrated with one or more arrows and/or sequences of arrows displayed to show the desired adjustments. Additionally or alternatively, an animation may be played back showing the desired physical adjustments to be implemented. In some embodiments, the animation may be illustrated with a generic item, while in other instances, the imaging of the actual item can be utilized to generate a representative graphical model of the item and the graphical model can be displayed with one or more arrows, sequence of arrows, text and/or audio, and/or animation illustrating the physical adjustments to be implemented. Further, in some implementations, the authentication control circuit can provide the user with feedback regarding the physical movement and/or adjustment of one or more sensor systems in order to orient the one or more sensor systems relative to a current orientation or expected orientation of the item.

As described above, in some instances the authentication instructions define how the authentication system is to implement physical adjustments to the item and/or sensor systems to achieve an intended orientation. In some embodiments, the authentication control circuit can issue orientation instructions based on the authentication instructions and/or determination of adjustments to be implemented to achieve an instructed orientation, to control one or more motors and/or one or more manipulation systems 130 cooperated with the housing 102. The set of authentication instructions may, for example, comprise motor instructions to control one or more motors to alter a physical orientation of at least one of the item and/or a sensor system of the set of sensor systems to achieve an intended physical orientation between at least the intended sensor system and the item. Additionally or alternatively, the control circuit can determine a current orientation (e.g., based on multiple key or distinct features of the item), determine an orientation difference between the current orientation and the desired orientation, and determine adjustments to achieve the desired orientation (e.g., rotate 90 degrees about a first axis and 45 degrees about a second axis; press a portion down; lift a portion up; move a portion of the item (e.g., lift a flap, open a compartment, etc.); and the like). The authentication control circuit can use the instructions communicate instructions or control signals to control the motor in accordance with the motor instructions to physically adjust at least one of the sensor system and/or the item to achieve the intended physical orientation between the sensor system and the item.

In some embodiments, the authentication control circuit 104 is further configured to distribute some or all of the current authentication sensor data, a determined level of authentication (or lack of authentication or failure to achieve a threshold level of authentication), and other such information to be incorporated into the set of multiple current historic authentication sensor data (which later becomes part of the historic authentication sensor data) within the item authentication block specific to the item. The incorporation of the current authentication sensor data and/or other data can be used in subsequent authentications of the item. This update, in accordance with the distributed ledger, can be distributed to ensure accuracy and prevent counterfeiting.

Figure 3:
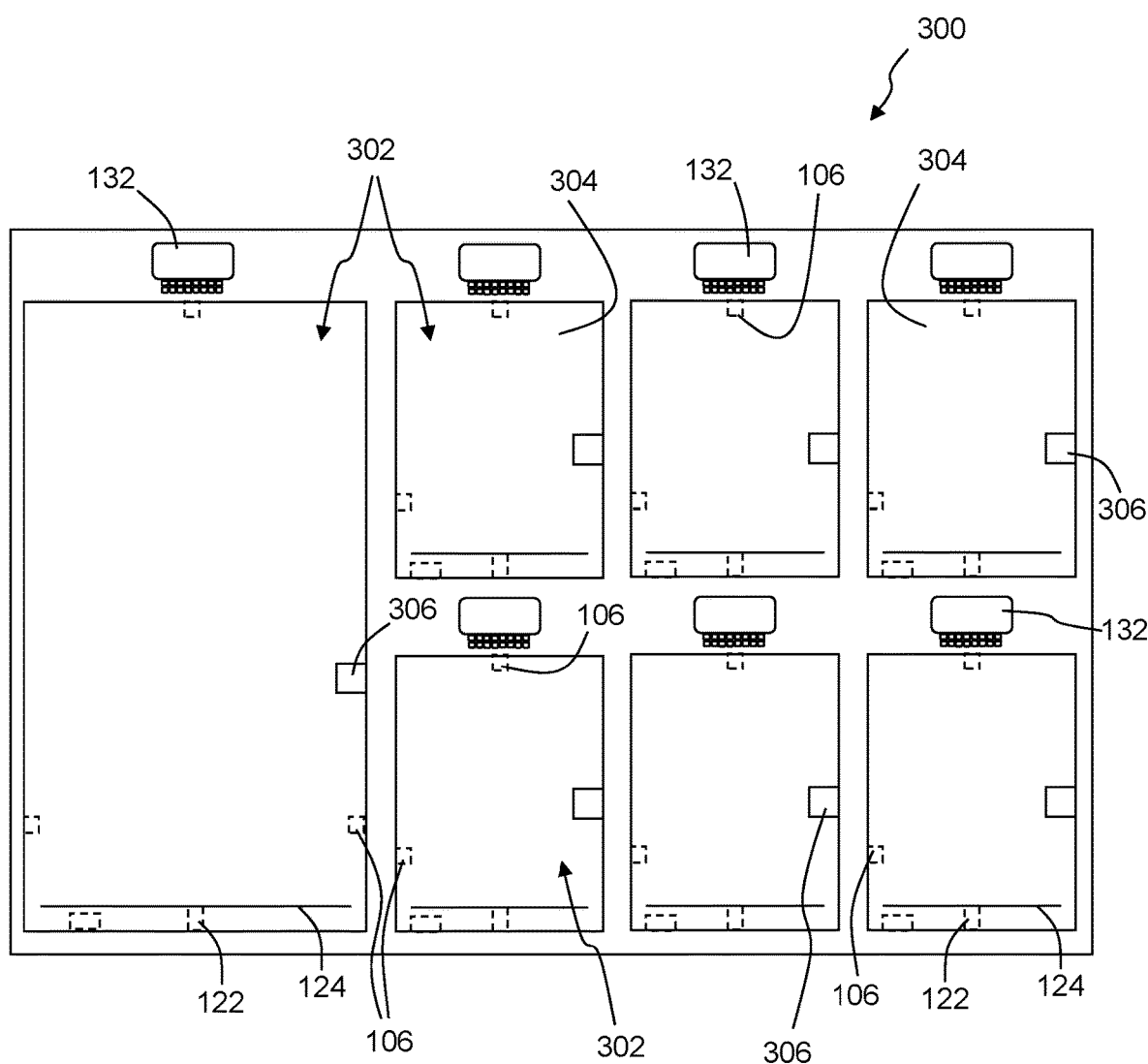
FIG. 3 illustrates a simplified block diagram of an authentication locker system having one or more lockers, in accordance with some embodiments.

In some embodiments, the authentication system further provides storage of the item prior to and/or after authentication until an authorized user retrieves the item. As such, in some implementations, the authentication system may include one or more doors and/or locks that close off the item cavity 112 and prevent access until an authorization is received. FIG. 3 illustrates a simplified block diagram of an authentication locker system 300 having one or more lockers 302, in accordance with some embodiments. In some embodiments, each locker 302 is an authentication system 100 and/or includes an authentication system. As such, the lockers include at least one or more authentication control circuits 104, one or more sensor systems 106, and one or more transceivers. In some applications, the authentication system 100 in a locker further includes one or motors 122, support 124, and the like. In other embodiments less than all of the lockers are or include an authentication system 100. In yet other embodiments, the locker system 300 includes a single authentication system 100 separate from the lockers, with lockers 302 available to retain the item after authentication. The locker system enables one or more users to place an item within the item cavity and initiate an authentication. Further, when relevant, the locker system may enable a user to lock an item into the locker to prevent access until a subsequent time, such as when a subsequent purchaser provides sufficient identifying information to gain access to the item. As such, the authentication system facilities transactions between users (e.g., a seller can authenticate an item, and the buyer can receive the authentication prior to completing the purchase and be assured that the item in the locker is the item purchased based on the locker being locked). In some instances, the individual receiving the item may initiate the authentication or initiate a subsequent authentication as a further reassurance of authenticity of the item. A fee may be charged for each transaction, each authentication, a duration maintained in the locker system, other such fees, or a combination of such fees.

In some embodiments, one or more of the lockers 302 each include the housing 102 and a door 304 cooperated with the housing relative to the item cavity. The door can be configured to prevent and enable access to the cavity. Typically, a lock system 306 is secured with the housing and/or door and is configured to lock the door to close the item cavity and secure an item within the item cavity. In some instances, a robotic system that is inaccessible to users may move an item from a locker having an authentication system to a separate locker that does not include an authentication system freeing up the authentication system for subsequent use while still ensuring that the previously authenticated item is secure. For example, a robotic system may access the item cavity from an access opening in the back of the item cavity and physically move the item to a selected locker.

In some embodiments, the locker system 300 includes one or more user interfaces 132 enabling one or more users to interact with the locker system (e.g., initiate an authentication process, provide confirmation of identifying information (e.g., password, pass code, customer account ID or number, credit card information (e.g., through a credit card reader as part of the user interface, or manually entered), wireless communication with the user's smartphone or other user interface system (e.g., Bluetooth communication of a passcode, key, or the like), other such information, or combination of such information). Further, in some embodiments, the authentication control circuit is communicatively coupled with the lock system 306 and configured to activate the lock system to lock or unlock the lock system. For example, the authentication control circuit can confirm an identification of a user (e.g., selling user, purchasing user, etc.) physically present at a location of the authentication system (e.g., through the user interface, communications from the user's smartphone, etc.) or receive a confirmation of the identification of a user purchasing user physically present at the location of the authentication system (e.g., through the user interface 132, communications with a remote server or service, or other such confirmation). In some instances, the authentication control circuit can further receive confirmation of payment by the purchasing user for the item. The authentication control circuit can activate the lock system 306 to unlock the lock system in response to confirming the identification of the purchasing user and the payment by the purchasing user. In some embodiments, the authentication control circuit can further update the item authentication block with a confirmation of a transfer of ownership of the item to the purchasing user.

In some instances, the authentication system is simplified to exclude the housing, support 124, motors and/or one or more other components described above. Such simplified authentication systems can reduce the cost to provide the authentication service while still providing at least a threshold level of authentication. In some embodiments, some or all of the authentication system may be implemented through a user's personal user interface system 202 (e.g., smartphone, tablet, laptop, digital camera, etc.). A user or party to a transaction may utilize their own personal user interface system 202 to implement at least a portion of an authentication system. For example, a user may not have access to a full authentication system. Such simplified authentication systems, however, are configured to provide at least a threshold level of confirmation of an authenticity relative to one or more threshold levels of confidence, determine a lack of authenticity, provide a notification of an inability to confirm an authenticity of an item within a threshold level, and/or provide other information regarding the authentication process.

Figure 4:
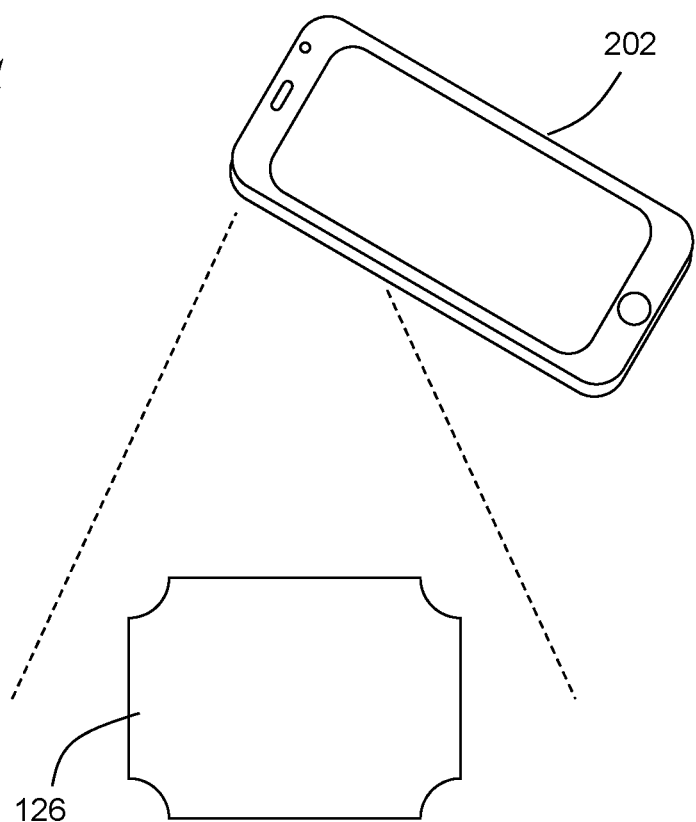
FIG. 4 illustrates an exemplary user interface system positioned relative to an item that a user is attempting to authenticate, in accordance with some embodiments.
Figure 5:
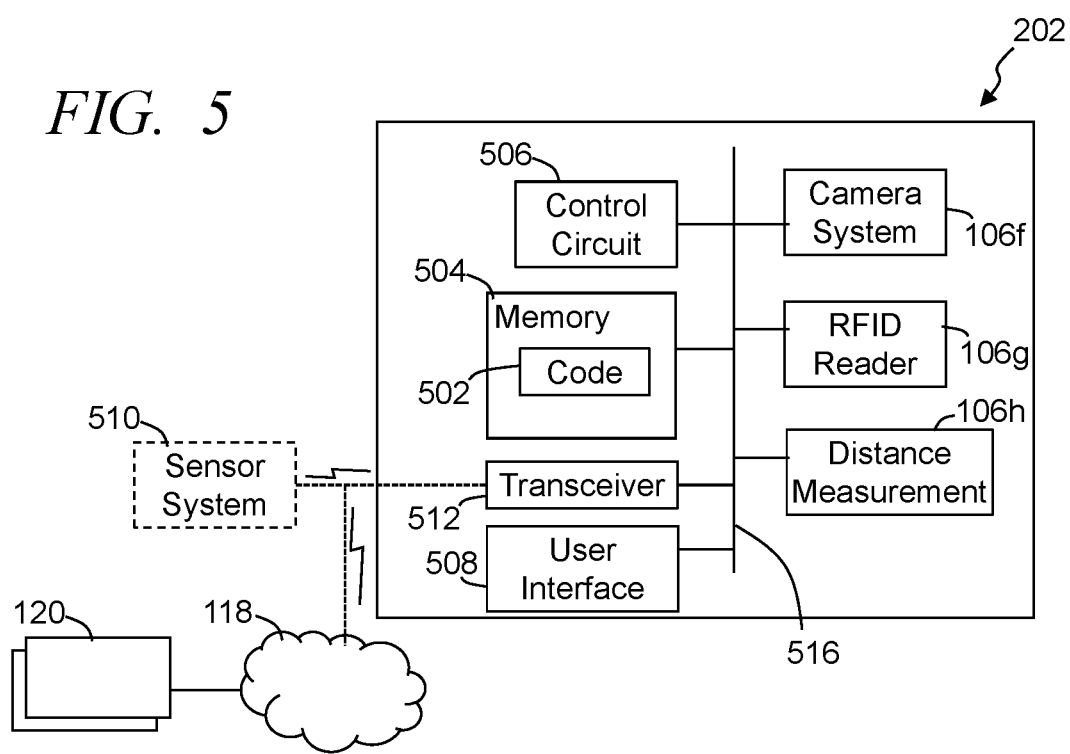
FIG. 5 illustrates a simplified block diagram of a user interface system showing components of the user interface system relevant to the authentication of items, in accordance with some embodiments.

FIG. 4 illustrates an exemplary user interface system 202 positioned relative to an item 126 that a user is attempting to authenticate, in accordance with some embodiments. FIG. 5 illustrates a simplified block diagram of a user interface system 202 showing components of the user interface system relevant to the authentication of items, in accordance with some embodiments. Referring to FIGS. 4-5, the user interface system 202 can include one or more control circuits 506, one or more memory 504, one or more user interface 508 (e.g., display, buttons, touchscreen, audio processing, etc.), one or more transceivers 512, sensor systems 106 of the user interface system, one or more communication paths and/or busses 516, and/or other such components. In some implementations, the control circuit 506 can implement a software application (APP) and/or other code 502 stored in memory 504 of the user interface system and/or accessed via wired and/or wireless communication over one or more distributed networks 118 that can be implemented by one or more device control circuits 506 (e.g., processors and/or microprocessors) of the user interface system 202 operating as at least part of the authentication control circuit 104, in accordance with some embodiments. One or more of user interface system sensor systems 106 (e.g., camera 106f, with image processing can be used to capture images and evaluate aspects of the item (e.g., dimensions, physical characteristics, color comparisons, etc.), RFID tag reader 106g, distance measurement system 106h, and other such sensor systems of the user interface system) and/or external sensor system 510 in communication with the user interface system can be utilized to obtain sensor data usable in attempting to authenticate an item. The sensor systems of the user interface system (and/or external to the user interface system) can be operated similar to the sensor systems 106 of the authentication system 100. The processor operating as the authentication control circuit can communicate with the blockchain database sources 120 to access the item authentication block specific to the item 126 attempting to be authenticated.

Based on the sensor data, the authentication control circuit can evaluate sensor data in determining whether a threshold level of authentication can be determined. In some embodiments, the authentication processing directs accesses to a set of interface system authentication rules that when applied (e.g., by the control circuit 506) enhance the operation of the user interface system and enable the user interface system to operate as at least part of an authentication system. In applying one or more of the authentication rules, the multiple current authentication sensor data can be compared to the one or more sets of multiple historic authentication sensor data accessed through the blockchain database sources. Based on the comparison, the control circuit can confirm, in authenticating the item, whether and/or when each of a threshold number of the multiple current authentication sensor data is consistent within a threshold variation of a corresponding one of the set of multiple historic authentication sensor data.

The user interface system can further access authentication instructions similar to those applied by a fixed authentication system 100. Such authentication instructions can control at least part of the user interface system in activating one or more sensor systems. Such activation may be defined in accordance with a predefined sequence to acquire relevant sensor data and/or levels of sensor data. Still further, in some embodiments, the authentication instructions may provide instructions to a user regarding an orientation of the item and/or user interface system. The authentication instructions may cause the control circuit 506 504 to communicate instructions to the user regarding the positioning of the item and/or a positioning of the user interface system or a sensor system of the user interface system relative to a position and/or orientation of the item. In some embodiments one or more sets of authentication instructions can include instructions that can be communicated to the user defining how to achieve one or more intended physical orientations between one or more sensor systems of the set of sensor systems and the physical position of the item 126. These instructions can be presented through one or more user interfaces 508 of the user interface system (e.g., display, touch screen, audio input/output, lights, etc.). For example, instructions can be presented on a display of the user interface system, audibly presented, one or more lights may be generated, animation and/or graphics may be displayed, and the like.

Further, the authentication control circuit is typically further configured to provide feedback to a user directing the user to make physical adjustments to achieve the desired physical orientation between one or more sensor systems and the item. In some applications, one or more imaging sensor systems can capture images that are processed to determine a physical position of the item 126 (e.g., physical position, orientation, whether some portions of the item are obscured (e.g., by folds in the item, whether the item is positioned shown a top or a bottom, etc.), and determine an orientation of the user interface system and/or one or more sensor systems of the user interface system relative to the determined physical position of the item. Based on the determined orientation of the user interface system, the control circuit 506 can direct the user to move the user interface system toward a desired position and/or orientation (e.g., left, right, up, down, closer, further away, clockwise, counter-clockwise, tilt, yaw, etc.). Similarly, other sensor systems can additionally or alternatively be used to provide feedback (e.g., distance measurement systems can provide feedback to the control circuit, RFID tag reader can provide feedback regarding whether and when an RFID tag is read, light sensor system can provide feedback regarding a desired level of ambient light and/or glare, color sensor systems can provide feedback regarding lighting, glare and the like, accelerometer can provide information about stability and/or orientation of the user interface system, other such sensor systems can provide other such feedback). As described above, the instructions may include displaying one or more graphics, sequence of images, animation, text, other such information, or a combination of two or more of such information. Similarly, the instructions can direct the use to move and/or alter a portion of or the entire item (e.g., turn over, unfold a portion, lift a flap, open, etc.). This feedback can continue until the item and/or the user interface system are moved to within thresholds of a desired position and orientation is achieved in order to capture one or more sensor data for one or more sensor systems.

Referring to FIGS. 1-5, some embodiments apply one or more authentication rules in determining whether an item meets one of multiple different levels of authentication. These different levels correspond to different confidence levels that the item being authenticated is the item previously authenticated and corresponding to the item authentication block. In some embodiments, different sets of authentication instructions are available and each set corresponds to a different level of accuracy of authentication of the item. At least some of these different sets are defined to correspond to capabilities of at least one of multiple different types of authentication systems, the available sensor systems of an authentication system and/or the expected precision from those available sensor systems. One or more system evaluation rules can be applied to identify available sensor systems and their expected precision, which is typically dependent on the quality of the sensor system, control over the sensor systems and/or their positioning relative to the item, error rates of the sensor systems, processing capabilities of the sensor systems and/or corresponding control circuits, abilities to communicate some or all of the sensor data to an external processing system (e.g., external image processing system), other such factors, or typically a combination of two or more of such factors. As such, the authentication control circuit in obtaining a set of authentication instructions is configured to identify a set of authentication instructions from multiple different sets of instructions. Again, some or all of the different sets of authentication instructions can each correspond to a different level of accuracy of authentication of the item, and at least some correspond to capabilities of at least one of multiple different types of authentication systems and/or sensor systems available to the authentication system.

Figure 6:
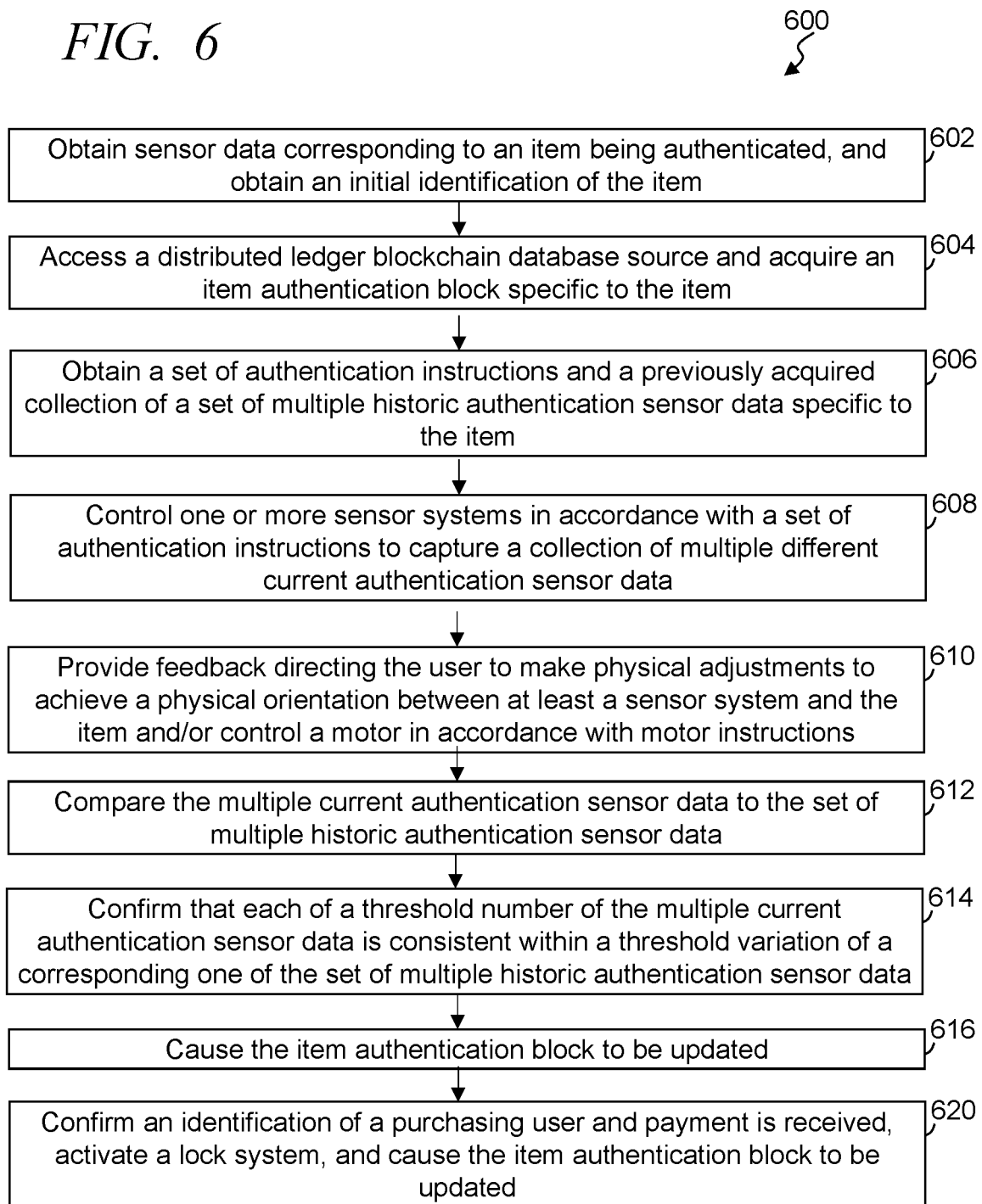
FIG. 6 illustrates a simplified flow diagram of a process of providing distributed item authentication, in accordance with some embodiments.

FIG. 6 illustrates a simplified flow diagram of a process 600 of providing distributed item authentication, in accordance with some embodiments. In step 602, sensor data corresponding to an item being authenticated is obtained from at least an item identifying sensor system of a set of sensor systems. Typically, an initial identification of the item is obtained based on the sensor data. As described above, the sensor data can include RFID tag sensor data, image data, other such data, or a combination of two or more of such sensor data. In step 604, a distributed ledger blockchain database source (e.g., cryptographic distributed ledger blockchain database source) is accessed and an item authentication block specific to the item is acquired. In some implementations, the blockchain database source is accessed through a transceiver of the authentication system and over a distributed computer and/or communications network 118.

In step 606, one or more sets of authentication instructions are obtained from the item authentication block and can be applied in authenticating the item. Further, in some embodiments, a previously acquired collection of a set of multiple historic authentication sensor data specific to the item is obtained from the item authentication block. In step 608, one or more sensor systems of the set of sensor systems of an authentication system are controlled in accordance with the set of authentication instructions to capture a collection of multiple different current authentication sensor data specific to the item. The set of authentication instructions, in at least some instances, specifies a sequence in which to implement multiple sensor systems of the set of sensor systems. The control of the one or more sensor systems can include the activation, in accordance with the specified sequence, each of the multiple sensor systems as specified by the first set of authentication instructions in capturing at least some of the current authentication sensor data. Additionally or alternatively, the set of authentication instructions can include instructions for how to achieve a physical orientation between one or more sensor systems of the set of sensor systems and the physical position of the item.

In some embodiments, the authentication instructions can include different instructions corresponding to different capabilities of an authentication system and/or user interface system being utilized to implement that authentication. Further, some of these different instructions can correspond to different levels of authentication. The different levels may be based on a cost to perform the authentication, time to perform the authentication, capabilities of the system used to perform the authentication, type of item being authenticated, value of the item being authenticated, desired level of confidence of the authentication, other such factors, or combination of two or more of such factors. As such, some embodiments in obtaining the set of authentication instructions identify a set of authentication instructions to be implemented from multiple different sets of instructions, where the different sets of instructions each corresponds to a different level of accuracy of authentication of the item and corresponds to capabilities of at least one of multiple different types of product authentication systems. A set of authentication instructions, in some applications, can be selected to correspond to current capabilities of an item authentication system that is to apply the set of authentication instructions.

Some embodiments can include step 610 where feedback is provided to motors, sensor systems and/or a user, and directs the motor, sensor systems and/or user to make physical adjustments to achieve the physical orientation between at least one of the sensor systems and the item. Some authentication instructions can define how the authentication system is to orient the item and/or how a user may make adjustments to the item and/or one or more sensor systems to achieve one or more intended positioning of the item to the one or more sensor systems and/or the one or more sensor systems relative to the item. In some embodiments, one or more sets of authentication instructions may include, for example, motor instructions to control at least one motor to alter a physical orientation of at least one of the item and at least one sensor system of the set of sensor systems to achieve an intended physical orientation between at least the sensor system and the item. One or more motors can be controlled in accordance with the motor instructions to physical adjust at least one of the sensor systems and/or the item to achieve the intended physical orientation between at least the sensor system and the item. Additionally or alternatively, the one or more sets of authentication instructions may include instructions to a user directing the user to physically manipulate the item, a user interface system and/or one or more sensor systems in order to achieve a desired positioning and orientation of the item relative to the one or more sensor systems. The instructions to the user may be audibly produced, displayed on a user interface system, displayed on a user interface, through other methods, or a combination of two or more of such methods. The instructions can include instructions such as but not limited to moving an item left, right, clock-wise, counter-clockwise, forward, backward, lifting a portion, moving a portion, etc.; moving a user interface left, right, clock-wise, counter-clockwise, forward, backward, up, down, tilt, rotate etc.; causing a sensor system to adjust a zoom, a focus, an orientation, etc.; other such instructions; or a combination of two or more of such instructions.

In step 612, the multiple current authentication sensor data is compared to the set of multiple historic authentication sensor data. In step 614, each of a threshold number of the multiple current authentication sensor data is confirmed, in authenticating the item, to be consistent within a threshold variation of a corresponding one of the set of multiple historic authentication sensor data. As described above, the threshold number and/or type of sensor data may vary depending on the type of sensor data acquired, the type of sensors used in acquiring the sensor data, the level of accuracy of those sensor systems, and/or other such factors. In step 616, the process causes the item authentication block within the distributed ledger blockchain database to be updated. In at least some instances, the update includes information regarding the confirmation of authentication of the item or the failure of the authentication. Further in some embodiments, the updating includes causing the multiple current authentication sensor data to be distributed to cause the item authentication block within the distributed ledger blockchain database to be updated to include the multiple current authentication sensor data to be available in one or more subsequent authentications of the item. In some instances, for example, the current authentication sensor data is distributed to be incorporated into the set of multiple historic authentication sensor data within the item authentication block specific to the item for use in subsequent authentication of the item.

Some embodiments optionally detect when an item is within a cavity of a housing of an authentication system. This detection, in some implementations, is part of step 902 or is a step prior to 902. This detection can be in response to information from one or more sensor systems. For example, one or more sensor systems may be activated in response to detecting a door being opened, a light beam being interrupted, a change in weight or the like. Some embodiments detect that a door, which is cooperated with the housing relative to the cavity and configured to prevent and enable access to the cavity, is closed. A lock system configured to lock the door to close the cavity and securing the item within the cavity can be activated. The activation of the lock system may be based on one or more sensor data, one or more activations by a user (e.g., through a user interface, communication from a user interface system, etc.).

In some embodiments, the process 600 includes step 620 where the authentication system confirms an identification of a purchasing user physically present at a location of an authentication system applying the first set of authentication instructions. In some instances, a confirmation of payment is received by the purchasing user for the item, and a lock system is activated to unlock a lock system in response to confirming the identification of the purchasing user and the payment by the purchasing user. Further, the item authentication block is typically further updated with a confirmation of a transfer of ownership of the item to the purchasing user.

In some implementations, the item authentication block are growing lists of records, which may be secured using cryptography. Blocks may contain a cryptographic hash of the previous block, one or more timestamps, and transaction data. By design, a blockchain is resistant to modification of the data. It is an open, distributed ledger that can record information about an item and/or about transactions efficiently and in a verifiable and permanent way. For use as a distributed ledger, a blockchain may be typically managed by a peer-to-peer network collectively adhering to a protocol for inter-node communication and validating new blocks. Once recorded, the data in any given block typically cannot be altered retroactively without alteration of subsequent blocks, which may be dependent on consensus of a network majority. In some embodiments, information added to a block are chronologically and publicly. Further, a blockchain may in some applications be a digitized, decentralized, public ledger of information (e.g., item identifying information, authentication information, cryptocurrency transactions, etc.).

Some embodiments include an original source of the item (e.g., manufacturer, distributor, etc.) generating and incorporating at least an original set of historic authentication data of the historic authentication sensor data within the item authentication block specific to the item. An original source can capture sensor data as the item is manufactured and/or assembled and/or after completing the manufacturing or assembly of the item. Further, the original source can cause the item authentication block to be created and/or direct a third party to create the item authentication block, and incorporate at least the original sensor data. Still further, the original source of the item may obtain over time multiple different sets of sensor data that can be incorporated into the item authentication block for use in subsequent authentication, confirmation that an item has been authenticated, a chain of authenticated ownership can be tracked, and the like. In some embodiments, a manufacturer or other source can provide origin information (e.g., high-resolution 3D scan image of the product as the product enters the supply chain, identifying information, etc.). This origin information is not restricted to exterior information, but can include information about an interior of an item or parts of an item (e.g., an interior of a purse, parts of an item that can be separated, etc.). Such origin information can be incorporated in a blockchain record exclusive to that item and that is associated with or follows the item for the lifecycle of the item. In some instances, the origin information or subsequent authentication information is acquired from an authentication system 100 that detects or identifies attributes of the item, which may include flaws and/or other unique aspects or identifiers in the finished item (e.g., captures through image and/or video analytics, 3D scans, etc.).

An item can subsequently be verified by performing subsequent authentication (e.g., imaging, scans, tag reads, etc.) and a comparison between current sensor data, origin authentication information and/or other previously acquired sensor data. Typically, upon authentication of an item, the corresponding block chain record can be updated. Similarly, when an item is sold or otherwise transferred, the system can update the corresponding block chain record (e.g., record of a sale, buyer identifying information, etc.). The authentication can further include confirming a seller has a proper chain of title through the block chain record. The authentication system can verify that the seller purchased the item. As described above, a person can bring an item to an authentication system and initiate an authentication of the item (e.g., placing the item into a locker 302). The sensor systems can include multiple technologies for validating the item (e.g., high-resolution 3D scanner, RFID reader, holographic label reader, serial number detector, digital watermark discover/scanner, imaging system, QR coded reader, other such sensor systems or combination of two or more of such sensor systems). For example, a video recognition system can be utilized to identify flaws that can be compared to historic information. Some embodiments utilize a blockchain for public aspects of the item authentication and sidechains for proprietary information (e.g., attributes, supplier and source information, cost, value, estimates, etc.). The sidechain information is typically linked to the blockchain record, but encrypted to limit access (e.g., customer or competitor may not have access).

Descriptions of some embodiments of blockchain technology are provided with reference to FIG. 7-12 herein. In some embodiments of the invention described above, blockchain technology may be utilized to record authentications, sensor data, historic sensor data, authentication failures, user identifiers, identifiers of parties to a transaction, cost of a transaction, images and/or scans, weight data, manufacturer date, manufacturer origin information, manufacturer information, certificate of authenticity by third party that is known for authenticity, serial number, lot number, sources of raw materials used to make up that item, hologram information, RFID information, bar code information, digital watermarking information (e.g., automatic identification and data capture (AIDC)), color accuracy (e.g., color and/or light spectrometer) information, hyperspectral imaging information (collects and processes information from across the electromagnetic spectrum), other such information, or a combination of two or more of such information. The authentication system 100, user interface systems 202, blockchain database sources, and other such systems described herein may comprise a node in a distributed blockchain system storing a copy of the blockchain record. Updates to the blockchain may comprise sensor data, authentication determination, identification of parties to a transactions, device identifiers, item identifier information, authentication locker system identifier information, information source information, location information, transaction information, transfer information, other such information, and typically a combination of two or more of such information. one or more nodes on the system may be configured to initiate a block, and/or incorporate one or more updates into blocks to add to the distributed database.

Distributed database and shared ledger database generally refer to methods of peer-to-peer record keeping and authentication in which records are kept at multiple nodes in the peer-to-peer network instead of kept at a trusted party. A blockchain may generally refer to a distributed database that maintains a growing list of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, a blockchain system comprises a distributed timestamp server comprising a plurality of nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it. A digital currency implemented on a blockchain system is described by Satoshi Nakamoto in "Bitcoin: A Peer-to-Peer Electronic Cash System" (bitcoin.org/bitcoin.pdf), the entirety of which is incorporated herein by reference.

Figure 7:
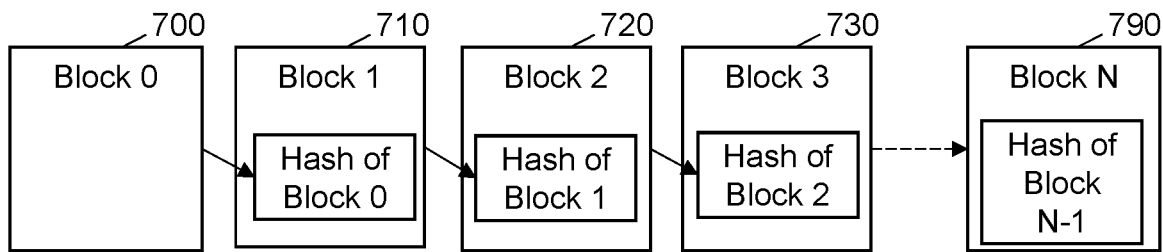
FIG. 7 comprises an illustration of blocks as configured in accordance with various embodiments of these teachings.

Now referring to FIG. 7, an illustration of a blockchain according to some embodiments is shown. In some embodiments, a blockchain comprises a hash chain or a hash tree in which each block added in the chain contains a hash of a previous block. In FIG. 7, block 0 700 represents a genesis block of the chain. Block 1 710 contains a hash of block 0 700, block 2 720 contains a hash of block 1 710, block 3 730 contains a hash of block 2 720, and so forth. Continuing down the chain, block N 790 contains a hash of block N−1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may comprise a hash chain stored on multiple nodes as a distributed database and/or a shared ledger, such that modifications to any one copy of the chain would be detectable when the system attempts to achieve consensus prior to adding a new block to the chain. In some embodiments, a block may generally contain any type of data and record. In some embodiments, each block may comprise a plurality of transaction and/or activity records.

In some embodiments, blocks may contain rules and data for authorizing different types of actions and/or parties who can take action. In some embodiments, transaction and block forming rules may be part of the software algorithm on each node. When a new block is being formed, any node on the system can use the prior records in the blockchain to verify whether the requested action is authorized. For example, a block may contain a public key of an owner of an asset that allows the owner to show possession and/or transfer the asset using a private key. Nodes may verify that the owner is in possession of the asset and/or is authorized to transfer the asset based on prior transaction records when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain. For example, in the Bitcoin system, "miners' are nodes that compete to provide proof-of-work to form a new block, and the first successful miner of a new block earns Bitcoin currency in return.

Figure 8:
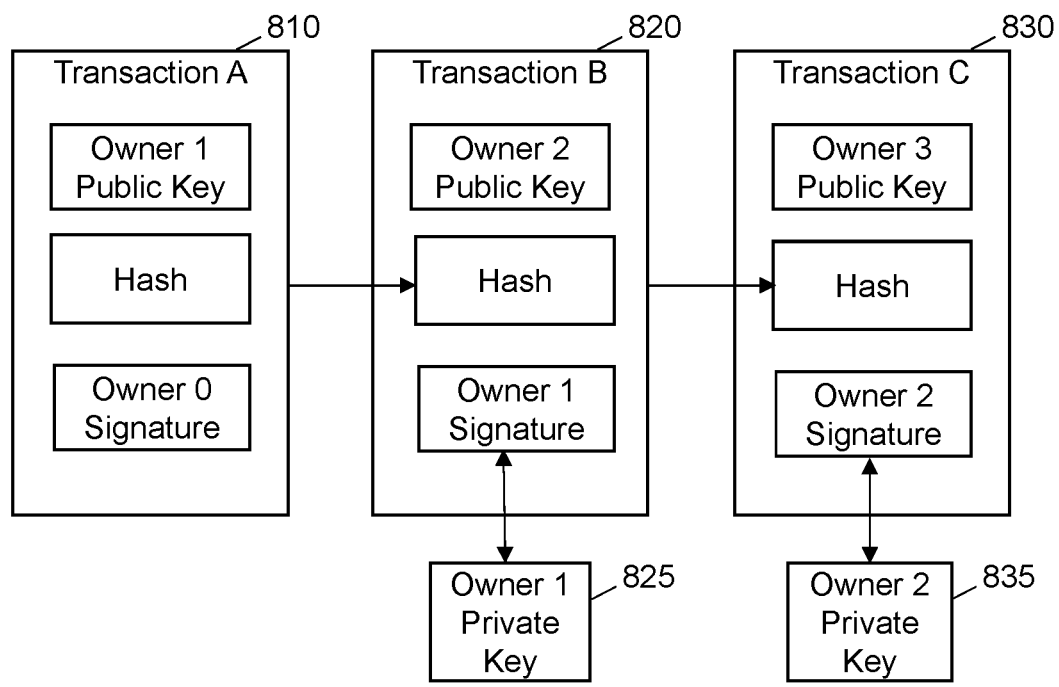
FIG. 8 comprises an illustration of transactions configured in accordance with various embodiments of these teachings.

Now referring to FIG. 8, an illustration of blockchain based transactions according to some embodiments is shown. In some embodiments, the blockchain illustrated in FIG. 8 comprises a hash chain protected by private/public key encryption. Transaction A 810 represents a transaction recorded in a block of a blockchain showing that owner 1 (recipient) obtained an asset from owner 0 (sender). Transaction A 810 contains owner's 1 public key and owner 0's signature for the transaction and a hash of a previous block. When owner 1 transfers the asset to owner 2, a block containing transaction B 820 is formed. The record of transaction B 820 comprises the public key of owner 2

(recipient), a hash of the previous block, and owner 1's signature for the transaction that is signed with the owner 1's private key 825 and verified using owner 1's public key in transaction A 810. When owner 2 transfers the asset to owner 3, a block containing transaction C 830 is formed. The record of transaction C 830 comprises the public key of owner 3 (recipient), a hash of the previous block, and owner 2's signature for the transaction that is signed by owner 2's private key 835 and verified using owner 2's public key from transaction B 220. In some embodiments, when each transaction record is created, the system may check previous transaction records and the current owner's private and public key signature to determine whether the transaction is valid. In some embodiments, transactions can be broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record to prevent the current owner from double spending the asset. The transactions in FIG. 8 are shown as an example only. In some embodiments, a blockchain record and/or the software algorithm may comprise any type of rules that regulate who and how the chain may be extended. In some embodiments, the rules in a blockchain may comprise clauses of a smart contract that is enforced by the peer-to-peer network.

Figure 9:
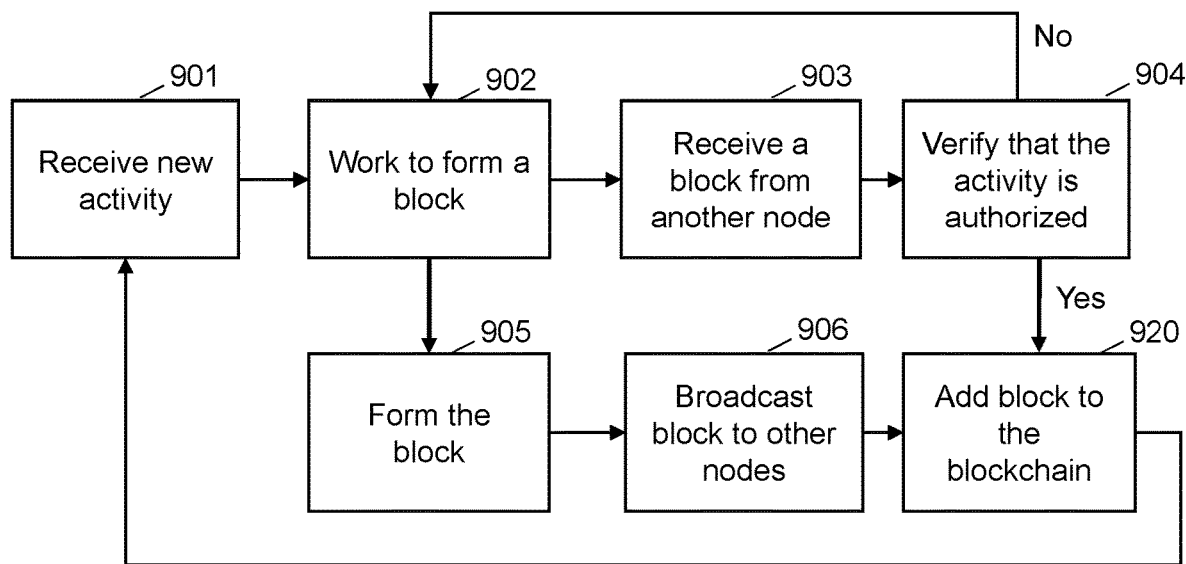
FIG. 9 comprises a flow diagram in accordance with various embodiments of these teachings.

Now referring to FIG. 9, a flow diagram according to some embodiments is shown. In some embodiments, the steps shown in FIG. 9 may be performed by a processor-based device, such as a computer system, a server, a distributed server, a timestamp server, a blockchain node, and the like. In some embodiments, the steps in FIG. 9 may be performed by one or more of the nodes in a system using blockchain for record keeping.

In step 901, a node receives a new activity. The new activity may comprise an update to the record being kept in the form of a blockchain. In some embodiments, for blockchain supported digital or physical asset record keeping, the new activity may comprise an asset transaction. In some embodiments, the new activity may be broadcasted to a plurality of nodes on the network prior to step 901. In step 902, the node works to form a block to update the blockchain. In some embodiments, a block may comprise a plurality of activities or updates and a hash of one or more previous block in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g. proof of work, proof of stake, etc.) which requires the node to solve a difficult mathematical problem for form a nonce in order to form a block. In some embodiments, the node may be configured to verify that the activity is authorized prior to working to form the block. In some embodiments, whether the activity is authorized may be determined based on records in the earlier blocks of the blockchain itself.

After step 902, if the node successfully forms a block in step 905 prior to receiving a block from another node, the node broadcasts the block to other nodes over the network in step 906. In some embodiments, in a system with incentive features, the first node to form a block may be permitted to add incentive payment to itself in the newly formed block. In step 920, the node then adds the block to its copy of the blockchain. In the event that the node receives a block formed by another node in step 903 prior to being able to form the block, the node works to verify that the activity recorded in the received block is authorized in step 904. In some embodiments, the node may further check the new block against system consensus rules for blocks and activities to verify whether the block is properly formed. If the new block is not authorized, the node may reject the block update and return to step 902 to continue to work to form the block. If the new block is verified by the node, the node may express its approval by adding the received block to its copy of the blockchain in step 920. After a block is added, the node then returns to step 901 to form the next block using the newly extended blockchain for the hash in the new block.

In some embodiments, in the event one or more blocks having the same block number is received after step 920, the node may verify the later arriving blocks and temporarily store these block if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 901.

Figure 10:
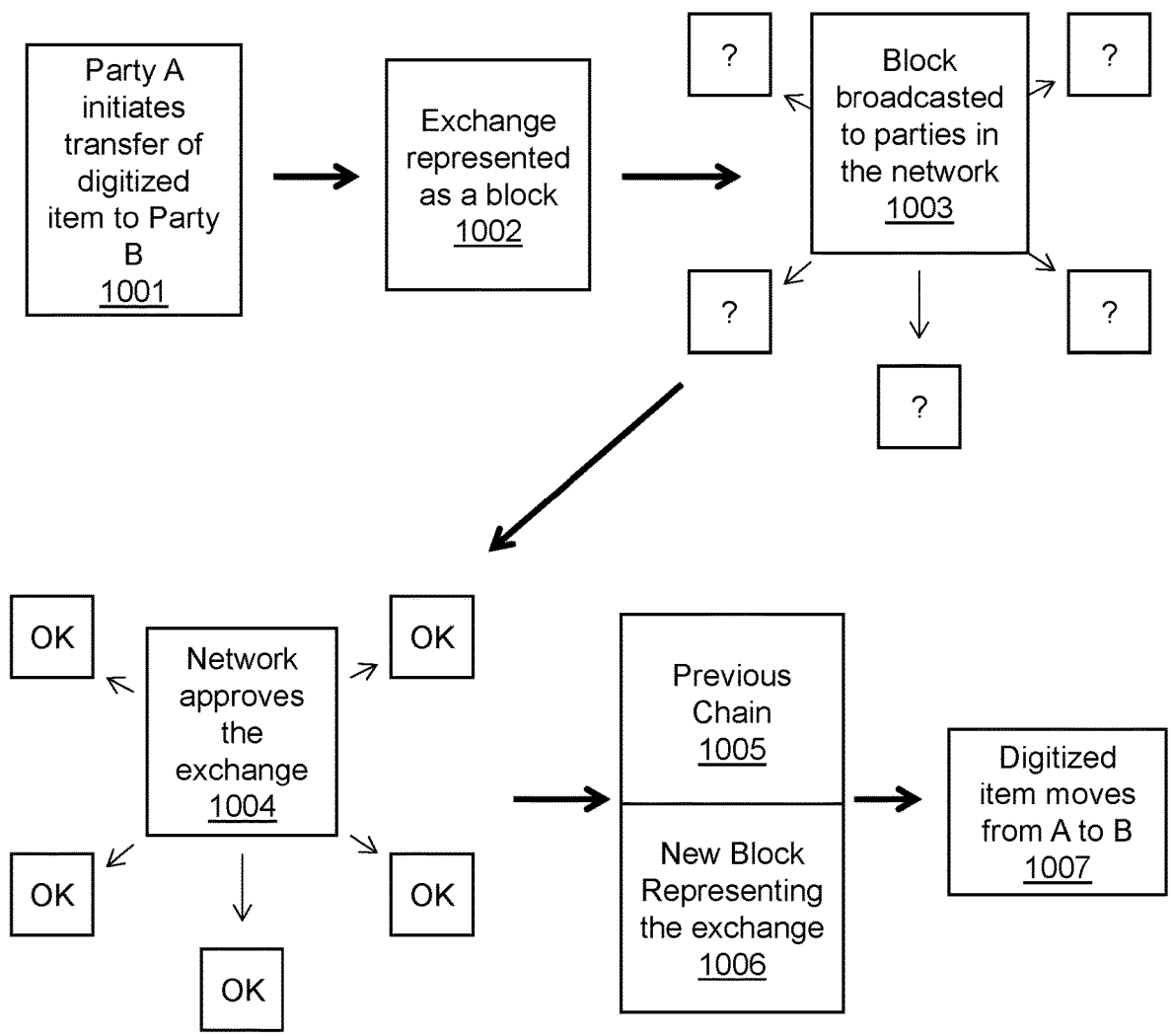
FIG. 10 comprises a process diagram as configured in accordance with various embodiments of these teachings.

Now referring to FIG. 10, a process diagram a blockchain update according to some implementations in shown. In step 1001, party A initiates the transfer of a digitized item to party B. In some embodiments, the digitized item may comprise a digital currency, a digital asset, a document, rights to a physical asset, etc. In some embodiments, Party A may prove that he has possession of the digitized item by signing the transaction with a private key that may be verified with a public key in the previous transaction of the digitized item. In step 1002, the exchange initiated in step 1001 is represented as a block. In some embodiments, the transaction may be compared with transaction records in the longest chain in the distributed system to verify part A's ownership. In some embodiments, a plurality of nodes in the network may compete to form the block containing the transaction record. In some embodiments, nodes may be required to satisfy proof-of-work by solving a difficult mathematical problem to form the block. In some embodiments, other methods of proof such as proof-of-stake, proof-of-space, etc. may be used in the system. In some embodiments, the node that is first to form the block may earn a reward for the task as incentive. For example, in the Bitcoin system, the first node to provide prove of work to for block the may earn a Bitcoin. In some embodiments, a block may comprise one or more transactions between different parties that are broadcasted to the nodes. In step 1003, the block is broadcasted to parties in the network. In step 1004, nodes in the network approve the exchange by examining the block that contains the exchange. In some embodiments, the nodes may check the solution provided as proof-of-work to approve the block. In some embodiments, the nodes may check the transaction against the transaction record in the longest blockchain in the system to verify that the transaction is valid (e.g. party A is in possession of the asset he/she s seeks to transfer). In some embodiments, a block may be approved with consensus of the nodes in the network. After a block is approved, the new block 1006 representing the exchange is added to the existing chain 1005 comprising blocks that chronologically precede the new block 1006. The new block 1006 may contain the transaction(s) and a hash of one or more blocks in the existing chain 1005. In some embodiments, each node may then update their copy of the blockchain with the new block and continue to work on extending the chain with additional transactions. In step 1007, when the chain is updated with the new block, the digitized item is moved from party A to party B.

Figure 11:
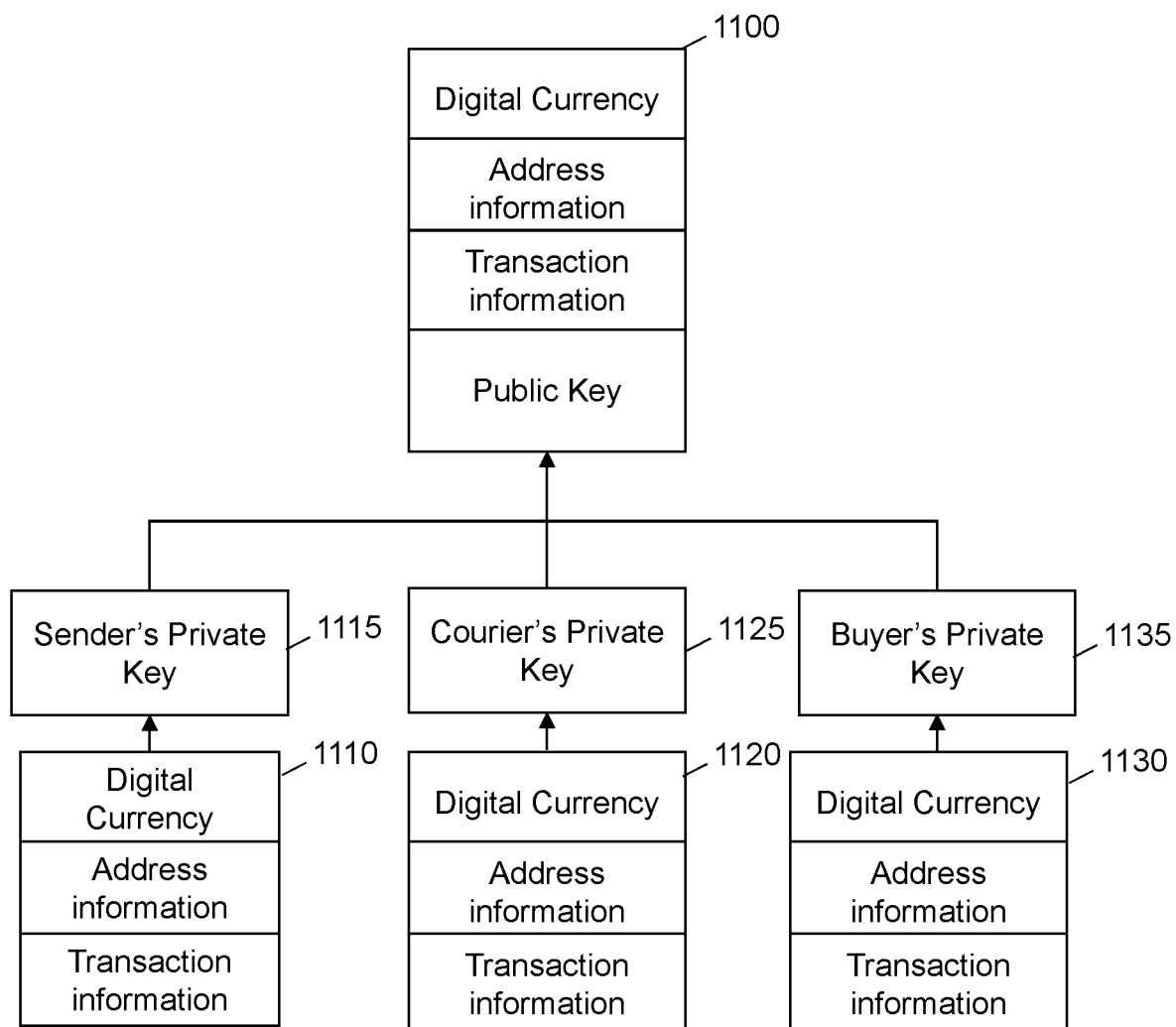
FIG. 11 comprises an illustration of a delivery record configured in accordance with various embodiments of these teachings.

Now referring to FIG. 11, a diagram of a blockchain according to some embodiments in shown. FIG. 11 comprises an example of an implementation of a blockchain system for delivery service record keeping. The delivery record 1100 comprises digital currency information, address information, transaction information, and a public key associated with one or more of a sender, a courier, and a buyer. In some embodiments, nodes associated the sender, the courier, and the buyer may each store a copy of the delivery record 1110, 1120, and 1130, respectively. In some embodiments, the delivery record 1100 comprises a public key that allows the sender, the courier, and/or the buyer to view and/or update the delivery record 1100 using their private keys 1115, 1125, and 1135, respectively. For example, when a package is transferred from a sender to the courier, the sender may use the sender's private key 1115 to authorize the transfer of a digital asset representing the physical asset from the sender to the courier and update the delivery record with the new transaction. In some embodiments, the transfer from the seller to the courier may require signatures from both the sender and the courier using their respective private keys. The new transaction may be broadcasted and verified by the sender, the courier, the buyer, and/or other nodes on the system before being added to the distributed delivery record blockchain. When the package is transferred from the courier to the buyer, the courier may use the courier's private key 1125 to authorize the transfer of the digital asset representing the physical asset from the courier to the buyer and update the delivery record with the new transaction. In some embodiments, the transfer from the courier to the buyer may require signatures from both the courier and the buyer using their respective private keys. The new transaction may be broadcasted and verified by the sender, the courier, the buyer, and/or other nodes on the system before being added to the distributed delivery record blockchain.

With the scheme shown in FIG. 11, the delivery record may be updated by one or more of the sender, courier, and the buyer to form a record of the transaction without a trusted third party while preventing unauthorized modifications to the record. In some embodiments, the blockchain based transactions may further function to include transfers of digital currency with the completion of the transfer of physical asset. With the distributed database and peer-to-peer verification of a blockchain system, the sender, the courier, and the buyer can each have confidence in the authenticity and accuracy of the delivery record stored in the form of a blockchain.

Figure 12:
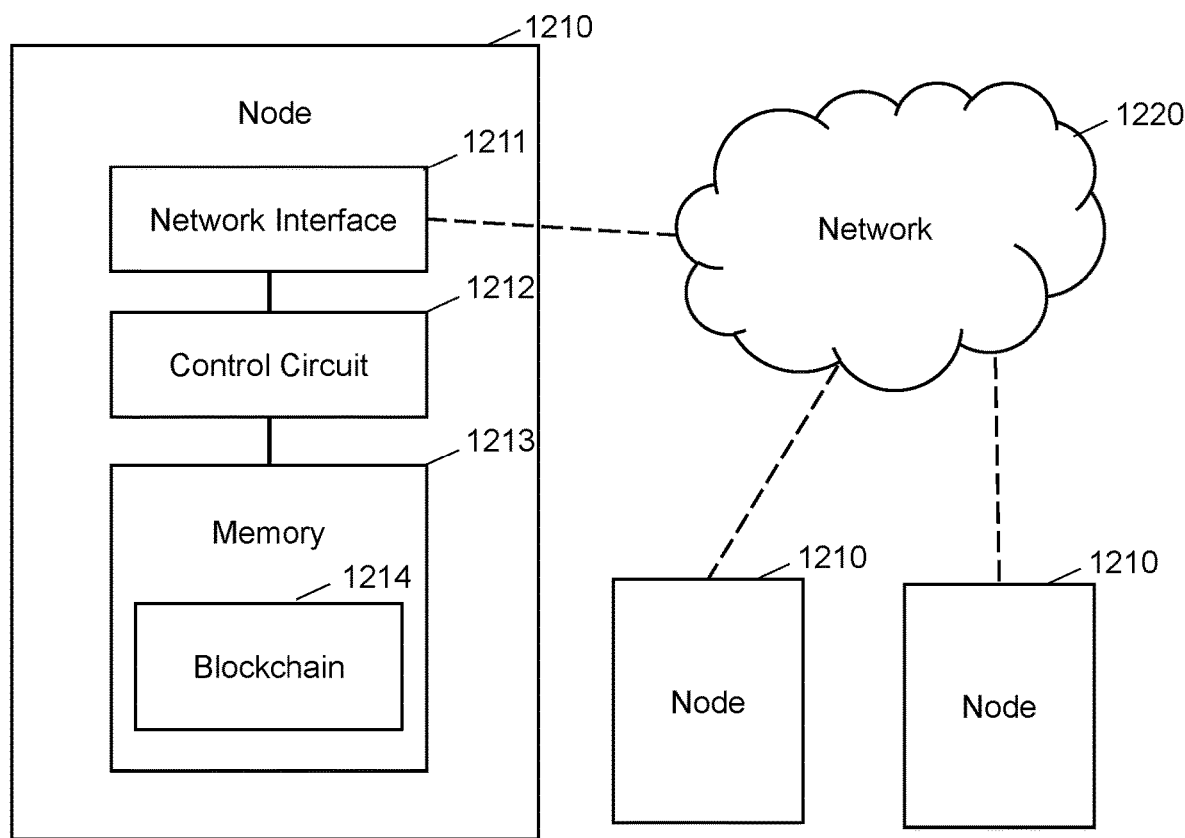
FIG. 12 comprise a system diagram configured in accordance with various embodiments of these teachings.

Now referring to FIG. 12, a system according to some embodiments is shown. A distributed blockchain system comprises a plurality of nodes 1210 communicating over a network 1220 (e.g., network 118). In some embodiments, the nodes 1210 may comprise a distributed blockchain server and/or a distributed timestamp server. In some embodiments, one or more nodes 1210 may comprise or be similar to a "miner" device on the Bitcoin network. Each node 1210 in the system comprises a network interface 1211, a control circuit 1212, and a memory 1213.

The control circuit 1212 may comprise a processor, a microprocessor, control logic, other such processing circuitry, or combination of two or more of such circuitry, and may be configured to execute computer readable instructions stored on a computer readable storage memory 1213. The computer readable storage memory may comprise volatile and/or non-volatile memory and have stored upon it a set of computer readable instructions which, when executed by the control circuit 1212, causes the node 1210 update the blockchain 1214 stored in the memory 1213 based on communications with other nodes 1210 over the network 1220. In some embodiments, the control circuit 1212 may further be configured to extend the blockchain 1214 by processing updates to form new blocks for the blockchain 1214. Generally, each node may store a version of the blockchain 1214, and together, may form a distributed database. In some embodiments, each node 1210 may be configured to perform one or more steps described with reference to FIGS. 9-10 herein.

The network interface 1211 may comprise one or more network devices configured to allow the control circuit to receive and transmit information via the network 1220. In some embodiments, the network interface 1211 may comprise one or more of a network adapter, a modem, a router, a data port, a transceiver, and the like. The network 1220 may comprise a communication network configured to allow one or more nodes 1210 to exchange data. In some embodiments, the network 1220 may comprise one or more of the Internet, a local area network, a private network, a virtual private network, a home network, a wired network, a wireless network, and the like. In some embodiments, the system does not include a central server and/or a trusted third party system. Each node in the system may enter and leave the network at any time.

With the system and processes shown in, once a block is formed, the block cannot be changed without redoing the work to satisfy census rules thereby securing the block from tampering. A malicious attacker would need to provide proof standard for each block subsequent to the one he/she seeks to modify, race all other nodes, and overtake the majority of the system to affect change to an earlier record in the blockchain.

In some embodiments, blockchain may be used to support a payment system based on cryptographic proof instead of trust, allowing any two willing parties to transact directly with each other without the need for a trusted third party. Bitcoin is an example of a blockchain backed currency. A blockchain system uses a peer-to-peer distributed timestamp server to generate computational proof of the chronological order of transactions. Generally, a blockchain system is secure as long as honest nodes collectively control more processing power than any cooperating group of attacker nodes. With a blockchain, the transaction records are computationally impractical to reverse. As such, sellers are protected from fraud and buyers are protected by the routine escrow mechanism.

In some embodiments, a blockchain may use to secure digital documents such as digital cash, intellectual property, private financial data, chain of title to one or more rights, real property, digital wallet, digital representation of rights including, for example, a license to intellectual property, digital representation of a contractual relationship, medical records, security clearance rights, background check information, passwords, access control information for physical and/or virtual space, and combinations of one of more of the foregoing that allows online interactions directly between two parties without going through an intermediary. With a blockchain, a trusted third party is not required to prevent fraud. In some embodiments, a blockchain may include peer-to-peer network timestamped records of actions such as accessing documents, changing documents, copying documents, saving documents, moving documents, or other activities through which the digital content is used for its content, as an item for trade, or as an item for remuneration by hashing them into an ongoing chain of hash-based proof-of-work to form a record that cannot be changed in accord with that timestamp without redoing the proof-of-work.

In some embodiments, in the peer-to-peer network, the longest chain proves the sequence of events witnessed, proves that it came from the largest pool of processing power, and that the integrity of the document has been maintained. In some embodiments, the network for supporting blockchain based record keeping requires minimal structure. In some embodiments, messages for updating the record are broadcast on a best-effort basis. Nodes can leave and rejoin the network at will and may be configured to accept the longest proof-of-work chain as proof of what happened while they were away.

In some embodiments, a blockchain based system allows content use, content exchange, and the use of content for remuneration based on cryptographic proof instead of trust, allowing any two willing parties to employ the content without the need to trust each other and without the need for a trusted third party. In some embodiments, a blockchain may be used to ensure that a digital document was not altered after a given timestamp, that alterations made can be followed to a traceable point of origin, that only people with authorized keys can access the document, that the document itself is the original and cannot be duplicated, that where duplication is allowed and the integrity of the copy is maintained along with the original, that the document creator was authorized to create the document, and/or that the document holder was authorized to transfer, alter, or otherwise act on the document.

As used herein, in some embodiments, the term blockchain may refer to one or more of a hash chain, a hash tree, a distributed database, and a distributed ledger. In some embodiments, blockchain may further refer to systems that uses one or more of cryptography, private/public key encryption, proof standard, distributed timestamp server, and inventive schemes to regulate how new blocks may be added to the chain. In some embodiments, blockchain may refer to the technology that underlies the Bitcoin system, a "sidechain" that uses the Bitcoin system for authentication and/or verification, or an alternative blockchain ("altchain") that is based on bitcoin concept and/or code but are generally independent of the Bitcoin system.

Descriptions of embodiments of blockchain technology are provided herein as illustrations and examples only. The concepts of the blockchain system may be variously modified and adapted for different applications.

In some embodiments, one or more of the exemplary embodiments include one or more localized IoT devices and controllers. As a result, in an exemplary embodiment, the localized IoT devices and controllers can perform most, if not all, of the computational load and associated monitoring and then later asynchronous uploading of sensor data, authentication information, set of multiple historic authentication sensor data, identifying information, summary data and the like can be performed by a designated one or more of the IoT devices to one or more remote servers. In this manner, the computational effort of the overall system may be reduced significantly. For example, whenever a localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of such data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KM may be discarded depending upon the degree to which such KRI has any value based on local processing and evaluation of such KM. In an exemplary embodiment, KM may not even be utilized in any form if it is determined that KM is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernals of data in order to filter out data that may reflect generic background data. In an exemplary embodiment, KRG incrementally sequences all future undefined cached kernals having encoded asynchronous data in order to filter out data that may reflect generic background data.

Figure 13:
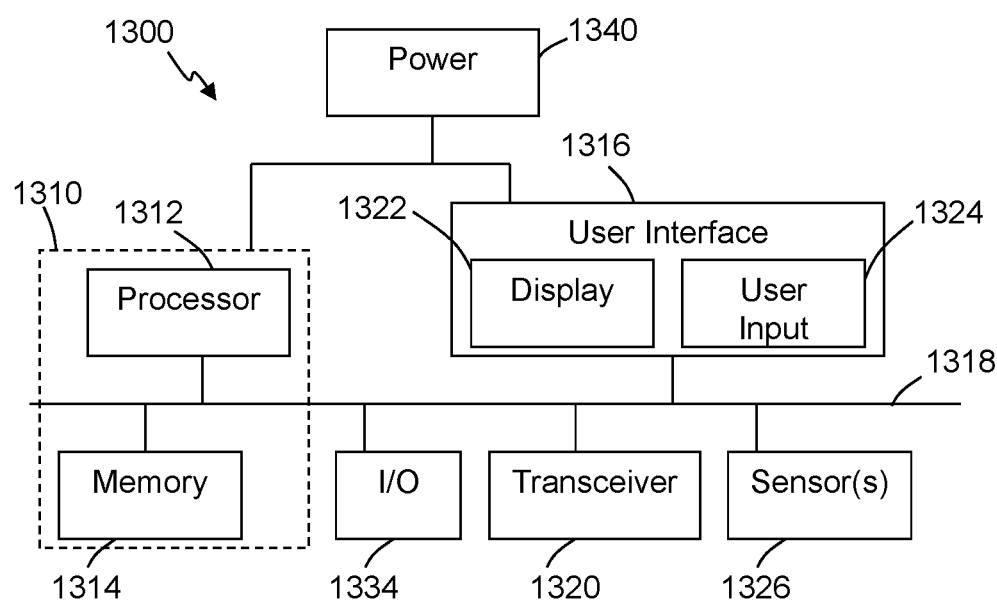
FIG. 13 illustrates an exemplary system for use in implementing methods, techniques, devices, apparatuses, systems, servers, sources and providing authentication of items, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 13 illustrates an exemplary system 1300 that may be used for implementing any of the components, circuits, circuitry, systems, functionality, apparatuses, processes, or devices of the system 100, and/or other above or below mentioned systems or devices, or parts of such circuits, circuitry, functionality, systems, apparatuses, processes, or devices. For example, the system 1300 may be used to implement some or all of the authentication control circuit 104, the sensor systems 106, database sources, manipulation systems, user interface, user interface systems 202, locker system 300, databases, and/or other such systems, components, circuitry, functionality and/or devices. However, the use of the system 1300 or any portion thereof is certainly not required.

By way of example, the system 1300 may comprise a control circuit or processor module 1312, memory 1314, and one or more communication links, paths, buses or the like 1318. Some embodiments may include one or more user interfaces 1316, and/or one or more internal and/or external power sources or supplies 1340. The control circuit 1312 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1312 can be part of control circuitry and/or a control system 1310, which may be implemented through one or more processors with access to one or more memory 1314 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1300 may be used to implement one or more of the above or below, or parts of, components, circuits, systems, processes and the like.

The user interface 1316 can allow a user to interact with the system 1300 and receive information through the system. In some instances, the user interface 1316 includes a display 1322 and/or one or more user inputs 1324, such as buttons, touch screen, track ball, keyboard, mouse, etc., which can be part of or wired or wirelessly coupled with the system 1300. Typically, the system 1300 further includes one or more communication interfaces, ports, transceivers 1320 and the like allowing the system 1300 to communicate over a communication bus, a distributed computer and/or communication network 118 (e.g., a local area network (LAN), the Internet, wide area network (WAN), etc.), communication link 1318, other networks or communication channels with other devices and/or other such communications or combination of two or more of such communication methods. Further the transceiver 1320 can be configured for wired, wireless, optical, fiber optical cable, satellite, or other such communication configurations or combinations of two or more of such communications. Some embodiments include one or more input/output (I/O) ports 1334 that allow one or more devices to couple with the system 1300. The I/O ports can be substantially any relevant port or combinations of ports, such as but not limited to USB, Ethernet, or other such ports. The I/O interface 1334 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors or sensor systems 1326 to provide information to the system and/or sensor information that is communicated to another component, such as the authentication control circuit 104, authentication processing system 210, user interface system 202, database sources 120, other such systems, or a combination of two or more of such systems. The sensors can include substantially any relevant sensor, such as but not limited to an imaging sensor system, weight sensor system, distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, color analysis system, 3D scanning system, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1300 comprises an example of a control and/or processor-based system with the control circuit 1312. Again, the control circuit 1312 can be implemented through one or more processors, controllers, central processing units, logic, software and the like. Further, in some implementations the control circuit 1312 may provide multiprocessor functionality.

The memory 1314, which can be accessed by the control circuit 1312, typically includes one or more processor-readable and/or computer-readable media accessed by at least the control circuit 1312, and can include volatile and/or nonvolatile media, such as RAM, ROM, EEPROM, flash memory and/or other memory technology. Further, the memory 1314 is shown as internal to the control system 1310; however, the memory 1314 can be internal, external or a combination of internal and external memory. Similarly, some or all of the memory 1314 can be internal, external or a combination of internal and external memory of the control circuit 1312. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 118. The memory 1314 can store code, software, executables, scripts, data, content, lists, programming, programs, log or history data, user information, customer information, product information, and the like. While FIG. 13 illustrates the various components being coupled together via a bus, it is understood that the various components may actually be coupled to the control circuit and/or one or more other components directly.

In some embodiments, systems and corresponding methods performed by the systems, provide distributed cryptographic item authentication systems. Some of the systems comprise: a housing; a set of sensor systems secured with the housing and wherein the set of sensor systems comprises at least an image capture system; a transceiver configured to enable communication over a distributed computer network to access a cryptographic distributed ledger blockchain database source; and an authentication control circuit coupled with non-transitory memory storing code that when implemented by the authentication control circuit causes the authentication control circuit to: obtain first sensor data from at least a first item identifying sensor system of an item being authenticated, and obtain an initial identification of the item based on the first sensor data; access, through the transceiver, the blockchain database source and acquire an item authentication block specific to the item; obtain, from the item authentication block, a first set of authentication instructions to be applied by the authentication control circuit in authenticating the item, and a previously acquired collection of a set of multiple historic authentication sensor data specific to the item; control one or more sensor systems of the set of sensor systems in accordance with the first set of authentication instructions to capture a collection of multiple different current authentication sensor data specific to the item; compare the multiple current authentication sensor data to the set of multiple historic authentication sensor data; confirm, in authenticating the item, that each of a threshold number of the multiple current authentication sensor data is consistent within a threshold variation of a corresponding one of the set of multiple historic authentication sensor data; and cause the item authentication block within the distributed ledger blockchain database to be updated to include the confirmation of authentication of the item.

Further, some embodiments, provide methods of distributed cryptographic item authentication, comprising: obtaining, from at least a first item identifying sensor system of a set of sensor systems, first sensor data corresponding to an item being authenticated, and obtaining an initial identification of the item based on the first sensor data; accessing, through a transceiver and over a distributed computer network, a cryptographic distributed ledger blockchain database source and acquiring an item authentication block specific to the item; obtaining, from the item authentication block, a first set of authentication instructions to be applied in authenticating the item, and a previously acquired collection of a set of multiple historic authentication sensor data specific to the item; controlling one or more sensor systems of the set of sensor systems in accordance with the first set of authentication instructions to capture a collection of multiple different current authentication sensor data specific to the item; comparing the multiple current authentication sensor data to the set of multiple historic authentication sensor data; confirming, in authenticating the item, that each of a threshold number of the multiple current authentication sensor data is consistent within a threshold variation of a corresponding one of the set of multiple historic authentication sensor data; and causing the item authentication block within the distributed ledger blockchain database to be updated to include the confirmation of authentication of the item.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A distributed cryptographic item authentication system, comprising:
   an authentication control circuit coupled with non-transitory memory storing code that when implemented by the authentication control circuit causes the authentication control circuit to:
      obtain an initial identification of an item being authenticated;
      access a blockchain database and acquire an item authentication block specific to the item based on the initial identification;
      obtain, from the item authentication block, a first set of authentication instructions to be applied in authenticating the item;
      obtain current authentication sensor data specific to the item based on one or more instructions of the first set of authentication instructions; and
      confirm an authentication of the item based on the current authentication sensor data relative to corresponding historic authentication sensor data.

2. The item authentication system of claim 1, wherein the authentication control circuit is further configured to cause the item authentication block within the blockchain database to be updated to include the current authentication sensor data.

3. The item authentication system of claim 1, wherein the first set of authentication instructions specifies a sequence to be implemented in acquiring the current authentication sensor data, and wherein the authentication control circuit is configured to control one or more sensor systems consistent with the specified sequence in capturing at least some of the current authentication sensor data.

4. The item authentication system of claim 3, wherein the authentication control circuit is further configured to distribute the current authentication sensor data to be incorporated into the historic authentication sensor data within the item authentication block specific to the item.

5. The item authentication system of claim 1, wherein the authentication control circuit is configured to provide feedback to a user directing the user to make physical adjustments to capture the current authentication sensor data based on a first physical orientation.

6. The item authentication system of claim 1, further comprising:
   a motor communicatively coupled with the authentication control circuit;
   wherein the first set of authentication instructions comprises motor instructions, and wherein the authentication control circuit is configured to control at least the motor in accordance with the motor instructions to implement physical adjustments in achieving a first physical orientation between the item and a first sensor system.

7. The item authentication system of claim 1, wherein the authentication control circuit in obtaining the first set of authentication instructions is configured to identify the first set of authentication instructions from multiple different sets of instructions, wherein the multiple different sets of instructions each corresponds to a different level of accuracy of authentication.

8. The item authentication system of claim 7, wherein a set of historic authentication sensor data of the historic authentication sensor data within the item authentication block specific to the item is generated by an original source of the item.

9. The item authentication system of claim 1, wherein the authentication control circuit is further configured to:
   confirm an identification of a purchasing user and update the item authentication block with a confirmation of a transfer of ownership of the item.

10. The item authentication system of claim 3, wherein the one or more sensor systems comprise an image capture system, wherein the current authentication sensor data comprises an image captured by the image capture system.

11. A method of providing distributed cryptographic item authentication, comprising:
   obtaining an initial identification of an item being authenticated;
   accessing a blockchain database and acquiring an item authentication block specific to the item based on the initial identification;
   obtaining, from the item authentication block, a first set of authentication instructions to be applied in authenticating the item;
   obtaining current authentication sensor data specific to the item based on one or more instructions of the first set of authentication instructions; and
   confirming an authentication of the item based on the current authentication sensor data relative to corresponding historic authentication sensor data.

12. The method of claim 11, further comprising:
   causing the item authentication block within the blockchain database to be updated to include the current authentication sensor data.

13. The method of claim 11, wherein the obtaining the current authentication sensor data comprises implementing a sequence to controlling a sensor system and capturing at least some of the current authentication sensor data.

14. The method of claim 13, further comprising:
   incorporating the current authentication sensor data into the historic authentication sensor data within the item authentication block specific to the item.

15. The method of claim 11, further comprising:
   providing feedback to a user and directing the user to make physical adjustments in capturing the current authentication sensor data based on a first physical orientation.

16. The method of claim 11, further comprising:
controlling a motor in accordance with an authentication instruction of the first set of authentication instructions implementing physical adjustments achieving a first physical orientation between a first sensor system and the item.

17. The method of claim 11, wherein the obtaining the first set of authentication instructions comprises identifying the first set of authentication instructions from multiple different sets of instructions, wherein the multiple different sets of instructions each corresponds to a different level of accuracy of authentication.

18. The method of claim 11, further comprising:
detecting the item is at least partially within a cavity of a housing of an authentication system and initiating the obtaining the current authentication sensor data.

19. The method of claim 11, further comprising:
confirming an identification of a purchasing user; and
causing the item authentication block to be updated with a confirmation of a transfer of ownership of the item.

20. A distributed item authentication system, comprising:
a housing; and
an authentication control circuit coupled with non-transitory memory storing code that when implemented by the authentication control circuit causes the authentication control circuit to:
obtain an initial identification of an item being authenticated;
access a blockchain database and acquire an item authentication block specific to the item;
obtain, from the item authentication block, a first set of authentication instructions to be applied in authenticating the item;
obtain current authentication sensor data specific to the item based on one or more instructions of the first set of authentication instructions; and
confirm that the current authentication sensor data is within a threshold variation of corresponding historic authentication sensor data.

* * * * *